US005202407A

United States Patent [19]

Pham et al.

[11] Patent Number: 5,202,407
[45] Date of Patent: Apr. 13, 1993

[54] PRECATALYZED CATALYST COMPOSITIONS, PROCESS FOR PREPARING EPOXY RESINS CURABLE COMPOSITIONS, ARTICLES RESULTING FROM CURING THE RESULTANT COMPOSITIONS

[75] Inventors: Ha Quoc Pham; Pamela A. Hardcastle, both of Lake Jackson, Tex.

[73] Assignee: The Dow Chemical Company, Midland, Mich.

[21] Appl. No.: 825,466

[22] Filed: Jan. 24, 1992

[51] Int. Cl.$^5$ .............................................. C08G 59/68
[52] U.S. Cl. ........................................ 528/89; 528/88; 528/92; 528/93; 528/94; 528/97; 528/98; 528/99; 525/523; 525/529; 568/8; 568/9; 252/182.3; 252/182.31; 252/182.14
[58] Field of Search ...................... 528/89, 92, 88, 94, 528/93, 97, 99, 98; 525/523, 529; 252/182.3, 182.31; 568/8, 9

[56] References Cited

U.S. PATENT DOCUMENTS

| | | |
|---|---|---|
| 3,048,552 | 8/1962 | Fang . |
| 3,114,731 | 12/1963 | Rumscheidt et al. . |
| 3,299,008 | 1/1967 | Mueller . |
| 3,477,990 | 11/1969 | Dante et al. . |
| 3,694,407 | 9/1972 | Krikorian ............................. 528/89 |
| 3,784,583 | 1/1974 | Smith . |
| 3,948,855 | 4/1976 | Perry . |
| 3,977,996 | 8/1976 | Katzakian, Jr. et al. . |
| 4,093,650 | 6/1978 | Doorakian et al. . |
| 4,132,706 | 1/1979 | Doorakian et al. . |
| 4,171,420 | 10/1979 | Doorakian et al. . |
| 4,171,422 | 10/1979 | Lazarus et al. . |
| 4,177,216 | 12/1979 | Doorakian et al. . |
| 4,192,939 | 3/1980 | Bacskai . |
| 4,266,079 | 5/1981 | Doorakian et al. . |
| 4,302,574 | 11/1981 | Doorakian et al. . |
| 4,340,761 | 7/1982 | Doorakian et al. . |
| 4,352,918 | 10/1982 | Whiteside, Jr. et al. . |
| 4,354,015 | 10/1982 | Doorakian et al. . |
| 4,366,295 | 12/1982 | Tyler, Jr. et al. . |
| 4,370,465 | 1/1983 | Whiteside, Jr. et al. . |
| 4,395,574 | 7/1983 | Doorakian et al. . |
| 4,405,766 | 9/1983 | Bertram et al. . |
| 4,410,596 | 10/1983 | Whiteside, Jr. et al. . |
| 4,438,254 | 3/1984 | Doorakian et al. . |
| 4,477,645 | 10/1984 | Doorakian et al. . |
| 4,496,709 | 1/1985 | Doorakian et al. . |
| 4,540,823 | 9/1985 | Doorakian et al. . |
| 4,634,757 | 1/1987 | Marshall . |
| 4,692,504 | 9/1987 | Frank . |
| 4,725,652 | 2/1988 | Bertram et al. . |
| 4,732,958 | 3/1988 | Jackson et al. . |
| 4,808,692 | 2/1989 | Pham et al. . |

FOREIGN PATENT DOCUMENTS

| | | |
|---|---|---|
| 1203943 | 4/1984 | Canada . |
| 855871 | 12/1960 | United Kingdom . |
| 8400171 | 1/1984 | World Int. Prop. O. . |

OTHER PUBLICATIONS

Chem Abstract 95:43350t(vol. 95, 1987,Pol. 107,627).
Chem Abstracts 110:39802c(1988).
"Quarternary Phosphonium Compounds as Latent Accelerators for Anydride-Cured Epoxy Resins I. Latency and Cure Characteristics" by J. D. B. Smith, *J. Applied Polymer Sc.*, vol. 23, 1385–1396.
"Quarternary Phosphonium Compound Latent Accelerators for Anhydride-Cured Epoxy Resins" by J. D. B. Smith, *ACS Symposium Series 114; American Chem. Soc.* pp. 47–56(1979).
Derwent Abstract 88-258052/37(D. 3,706,088).
Derwent Abstract 78-67356A/38 (D. 2,809,799).
Handbook of Epoxy Resins, Lee and Neville, McGraw-Hill Book Co., pp. 12–13(1967).

*Primary Examiner*—John Kight, III
*Assistant Examiner*—Richard Lee Jones

[57] ABSTRACT

The reaction between epoxy compounds and active hydrogen-containing compounds or anhydrides is catalyzed with a phosphine or phosphonium compound containing at least three $C_1$ to $C_4$ alkyl phenyl groups attached to the phosphorus atom per molecule.

5 Claims, No Drawings

PRECATALYZED CATALYST COMPOSITIONS, PROCESS FOR PREPARING EPOXY RESINS CURABLE COMPOSITIONS, ARTICLES RESULTING FROM CURING THE RESULTANT COMPOSITIONS

FIELD OF THE INVENTION

The present invention pertains to catalysts for the reaction of reactive hydrogen-containing compounds or acid anhydrides, particularly phenolic hydroxyl- and carboxyl-containing compounds with epoxides. compositions containing such catalysts, to processes employing such catalysts and curable and cured products or articles.

BACKGROUND OF THE INVENTION

High molecular weight epoxy resins have been previously prepared by reacting phenolic compounds with epoxide compounds in the presence of such catalysts as inorganic bases, amines, ammonium salts. phosphine and phosphonium salts such as described in U.S. Pat. Nos. 3,284,212; 3,547,881; 3,477,990; 3,948,855 and 4,438,254. However, most of these catalysts while being suitable for catalyzing the reaction between phenolic hydroxyl-containing compounds and epoxides, most of these catalysts possess some undesirable feature such as poor reactivity which requires high catalyst levels and ion reaction times: poor selectivity to the reaction of phenolic hydroxyl groups with epoxides, difficulty in deactivation and the like.

In batch processes or in a continuous process for the production of advanced resins such as by the extruder process disclosed in U.S. Pat. No. 4,612,156 it would be highly desirable to have available for use in that process a catalyst which would be highly active, highly selective to the reactive hydrogen atoms. particularly phenolic hydroxyl groups, and easily deactivated.

It would also be desirable to have a catalyst which will result in fast cures when an epoxy resin is cured with a curing agent particularly with acid anhydrides.

SUMMARY OF THE INVENTION

One aspect of the present invention pertains to an improvement an in a precatalyzed composition comprising (A) at least one compound containing average of at least one vicinal epoxide group per molecule and (B) at least one phosphonium or phosphine catalyst: wherein the improvement resides in employing as the phosphonium or phosphine catalyst, one having at least three $C_1$ to $C_4$ alkyl phenyl groups attached to the phosphorus atom per molecule.

By "alkyl phenyl group", it is meant a phenyl group substituted with an alkyl group Another aspect of the present invention pertains to an improvement in a process for preparing advanced resins by reacting one or more compounds having an average of more than one vicinal epoxide group per molecule with one or more compounds having an average of more than one, but not more than about two hydrogen atoms which are reactive with a vicinal epoxide group per molecule in the presence of a phosphonium or phosphine catalyst, with the proviso that (i) the composition can contain minor amounts of one or more compounds having an average or more than two hydrogen atoms which are reactive with a vicinal epoxide group per molecule which amounts are insufficient to cause gellation of the reaction mixture, and/or (ii) the composition can contain minor amounts of one or more compounds having an average of more than two vicinal epoxide groups per molecule which amounts are insufficient to cause gellation of the reaction mixture: wherein the improvement resides in employing as the phosphonium or phosphine catalyst, one having at least three $C_1$ to $C_4$ alkyl phenyl groups attached to the phosphorus atom per molecule.

By "gellation", it is meant that the product of the reaction is not sufficiently crosslinked so as to render it insoluble or infusible.

A further aspect of the present invention pertains to an improvement in a curable composition comprising (A) at least one vicinal epoxide-containing compound: (B) at least one phosphonium or phosphine compound: and (C) a suitable curing agent for said epoxy-containing compound, which curing agent contains (1) a plurality of hydrogen atoms reactive with a vicinal epoxide group or (2) one or more acid anhydride groups or (3) a combination of hydrogen atoms reactive with a vicinal epoxide group and acid anhydride groups: wherein the improvement resides in employing as the phosphonium or phosphine catalyst, one having at least three $C_1$ to $C_4$ alkyl phenyl groups attached to the phosphorus atom per molecule.

A still further aspect of the present invention pertains to the product or article resulting from curing the aforementioned curable composition.

The catalysts employed in the present invention are highly active, highly selective to phenolic hydroxyl groups, less susceptible to premature deactivation by heat or water and can be controllably deactivated. They also result in fast cures when an epoxy resin is cured with acid anhydrides in their presence.

The present invention may suitably comprise, consist of, or consist essentially of, the aforementioned components.

The invention illustratively disclosed herein suitably may be practiced in the absence of any component which is not specifically disclosed or enumerated herein and any of the compounds may contain or be free of any substituent not specifically named herein

DETAILED DESCRIPTION OF THE INVENTION

The precatalyzed compositions of the present invention can contain catalytic amounts of the phosphine or phosphonium compound or they can contain greater amounts so as to act as a masterbatch to blend with uncatalyzed epoxy resins so as to provide them with a catalyst.

When the phosphine or phosphonium compounds are employed in strictly catalytic amounts, they are employed in amounts of from about 0.0001 to about 0.1, preferably from about 0.0005 to about 0.05, more preferably from about 0.001 to about 0.005 percent by weight based on the weight of the epoxy resin.

When the phosphine or phosphonium compounds are employed in the larger amounts to form a masterbatch for adding to other epoxy resins, they are employed in amounts of from about greater than 0.1 to about 0.9. preferably from about 0.11 to about 0.75. more preferably from about 0.11 to about 0.5.

In the process of the present invention, the reactants are reacted together in the presence of the catalyst at any suitable temperature and pressure for a length of time sufficient to advance the resin to the desired molecular weight. Particularly suitable temperatures are from about 50° C. to about 280° C. more suitably from about 100° C. to about 240° C., most suitably from about 120° C. to about 220° C. Suitable pressures include atmospheric, subatmospheric and superatmospheric pressures. Particularly suitable pressures are those from about 1 psig (6.9 kPa) to about 150 psig (1,034.2 kPa), more suitably from about 5 psig (34.5 kPa) to about 80 psig (551.6 kPa), most suitably from about 10 psig (68.9 kPa) to about 20 psig (137.9 kPa). The time depends upon the particular catalyst and reactants employed as well as to the degree of advancement desired: however, particularly suitable reaction times include from about 0.5 to about 20, more suitably from about 1 to about 8, most suitably from about 1 to about 5 hours.

At reaction temperatures below about 50° C. the reaction proceeds at a very slow rate.

At reaction temperatures above about 280° C. catalyst and/or resin decomposition can occur.

At pressures below about 1 psig (6.9 kPa),the resin may develop color due to oxidation.

At reaction pressures above about 150 psig (1,034.2 kPa), while being operable are impractical.

The phosphine catalysts employed in the present invention include those represented by the following general formula I

Formula I herein each R is independently a $C_1$ to $C_4$ alkyl phenyl group. Particularly suitable phosphine catalysts include, for example, tri-o-tolylphosphine, tri-m-tolylphosphine, tri-p-tolylphosphine, trixylylphosphine, tri(propylphenyl)phosphines, tri(butylphenyl)phosphines, or any combination thereof and the like.

The phosphine catalysts can be prepared by reacting a haloalkylbenzene with molten sodium and phosphorous trichloride at a temperature of from about 10° C. to about 400° C. . preferably from about 50° C. to about 300° C. , more preferably from about 100° C. to about 200° C. for a time sufficient to complete the reaction, usually from about 1 to about 200, preferably from about 2 to about 100, more preferably from about 4 to about 50 hours.

Another method for the preparation of the phosphine catalyst is to react toluene or other alkyl substituted benzene compound with phosphorous trichloride in the presence of a Friedel-Crafts catalyst such as, for example, aluminum trichloride, boron trifluoride or the like at temperatures of from about 20° C. to about 400° C., preferably from about 50° C. to about 200° C., more preferably from about 80° C. to about 150° C. for a time sufficient to complete the reaction, usually from about 0.5 to about 48, preferably from about 1 to about 20, more preferably from about 2 to about 10 hours.

Various synthesis methods for preparing phosphines are described by D.E.C. Corbridge in "Phosphorous, An Outline of its Chemistry", *Biochemistry and Technology*, 3rd Edition, published by Elsevier (1985), which is incorporated herein by reference.

Phosphorous compounds such as phosphine oxides, phosphinous halides, phosphorous dihalides, phosphoric dihalides, phosphinic acids, phosphorous esters can be reduced with lithium aluminum hydroxides to produce phosphines.

Suitable phosphonium catalysts which can be employed herein include those represented by the following formulas II or III

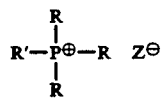

Formula II

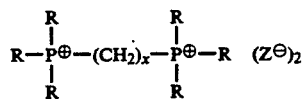

Formula III wherein each R is independently a $C_1$ to $C_4$ alkyl phenyl group; each R' is independently hydrogen, a monovalent hydrocarbyl group, a halogen, preferably bromine or chlorine, nitro or —C≡N or OH or alkyl or alkoxy or halogen substituted hydrocarbyl group having from 1 to about 20, more preferably from 1 to about 10, most preferably from 1 to about 6, carbon atoms, or an R group: Z is any suitable anion: and x has a value from 1 to about 20, preferably from about 1 to about 10, more preferably from about 2 to about 5.

The term "hydrocarbyl" as employed herein means any aliphatic, cycloaliphatic, aromatic, aryl substituted aliphatic or cycloaliphatic, or aliphatic or cycloaliphatic substituted aromatic groups. The aliphatic groups can be saturated or unsaturated.

Suitable anions include the halides, carboxylates, carboxylate.carboxylic acid complexes, conjugate bases of inorganic acids such as, for example, bicarbonate, tetrafluoborate or phosphate: conjugate bases of phenols, bisphenols or biphenols such as, for example, bisphenol A, bisphenol F, bisphenol K, bisphenol S: and the like.

Particularly suitable phosphonium catalysts include, for example,
ethyltri-o-tolylphosphonium chloride,
ethyltri-o-tolylphosphonium bromide,
ethyltri-o-tolylphosphonium iodide,
ethyltri-o-tolylphosphonium acetate.acetic acid complex,
ethyltri-o-tolylphosphonium phosphate,
ethyltri-m-tolylphosphonium chloride,
ethyltri-m-tolylphosphonium bromide,
ethyltri-m-tolylphosphonium iodide,
ethyltri-m-tolylphosphonium acetate.acetic acid complex,
ethyltri-m-tolylphosphonium phosphate,
ethyltri-p-tolylphosphonium chloride,
ethyltri-p-tolylphosphonium bromide
ethyltri-p-tolylphosphonium iodide,
ethyltri-p-tolylphosphonium acetate.acetic acid complex,
ethyltri-p-tolylphosphonium phosphate,
benzyltri-o-tolylphosphonium chloride,
benzyltri-o-tolylphosphonium bromide,
benzyltri-o-tolylphosphonium iodide,
benzyltri-o-tolylphosphonium acetate.acetic acid
benzyltri-o-tolylphosphonium phosphate,
benzyltri-m-tolylphosphonium chloride,
benzyltri-m-tolylphosphonium bromide,
benzyltri-m-tolylphosphonium iodide,
benzyltri-m-tolylphosphonium acetate.acetic acid complex, benzyltri-m-tolylphosphonium phosphate,
benzyltri-p-tolylphosphonium chloride,
benzyltri-p-tolyl-phosphonium bromide,
benzyltri-p-tolylphosphonium iodide,
benzyltri-p-tolylphosphonium acetate.acetic acid complex,
benzyltri-p-tolylphosphonium phosphate,
3-methoxybenzyltri-o-tolylphosphonium chloride,
3-methoxybenzyltri-o-tolylphosphonium bromide.
3-methoxybenzyltri-o-tolylphosphonium iodide,
3-methoxybenzyltri-o-tolylphosphonium acetate.acetic acid complex,
3-methoxybenzyltri-o-tolylphosphonium phosphate
3-methoxybenzyltri-m-tolylphosphonium chloride,
3-methoxybenzyltri-m-tolylphosphonium bromide,
3-methoxybenzyltri-m-tolylphosphonium iodide,
3-methoxybenzyltri-m-tolylphosphonium acetate.acetic acid complex,
3-methoxybenzyltri-m-tolylphosphonium phosphate
3-methoxybenzyltri-p-tolylphosphonium chloride,
3-methoxybenzyltri-p-tolylphosphonium bromide,
3-methoxybenzyltri-p-tolylphosphonium iodide,
3-methoxybenzyltri-p-tolylphosphonium acetate.acetic acid complex,
3-methoxybenzyltri-p-tolylphosphonium phosphate.
4-methoxybenzyltri-o-tolylphosphonium chloride,
4-methoxybenzyltri-o-tolylphosphonium bromide,
4-methoxybenzyltri-o-tolylphosphonium iodide,
4-methoxybenzyltri-o-tolylphosphonium acetate.acetic acid complex,
4-methoxybenzyltri-o-tolylphosphonium phosphate,
4-methoxybenzyltri-m-tolylphosphonium chloride,
4-methoxybenzyltri-m-tolylphosphonium bromide,
4-methoxybenzyltri-m-tolylphosphonium iodide,
4-methoxybenzyltri-m-tolylphosphonium acetate.acetic acid complex,
4-methoxybenzyltri-m-tolylphosphonium phosphate.
4-methoxybenzyltri-p-tolylphosphonium chloride,
4-methoxybenzyltri-p-tolylphosphonium bromide,
4-methoxybenzyltri-p-tolylphosphonium iodide.
4-methoxybenzyltri-p-tolylphosphonium acetate.acetic acid complex,
4-methoxybenzyltri-p-tolylphosphonium phosphate.
4-methylbenzyltri-o-tolylphosphonium chloride,
4-methylbenzyltri-o-tolylphosphonium bromide,
4-methylbenzyltri-o-tolylphosphonium iodide,
4-methylbenzyltri-o-tolylphosphonium acetate.acetic acid complex,
4-methylbenzyltri-o-tolylphosphonium phosphate,
4-methylbenzyltri-m-tolylphosphonium chloride,
4-methylbenzyltri-m-tolylphosphonium bromide,
4-methylbenzyltri-m-tolylphosphonium iodide,
4-methylbenzyltri-m-tolylphosphonium acetate.acetic acid complex,
4-methylbenzyltri-m-tolylphosphonium phosphate
4-methylbenzyltri-p-tolylphosphonium chloride.
4-methylbenzyltri-p-tolylphosphonium bromide,
4-methylbenzyltri-p-tolylphosphonium iodide,
4-methylbenzyltri-p-tolylphosphonium acetate.acetic acid complex,
4-methylbenzyltri-p-tolylphosphonium phosphate,
3,5-dinitrobenzyltri-o-tolylphosphonium chloride.
3,5-dinitrobenzyltri-o-tolylphosphonium bromide,
3,5-dinitrobenzyltri-o-tolylphosphonium iodide,
3,5-dinitrobenzyltri-o-tolylphosphonium acetate.acetic acid complex,
3,5-dinitrobenzyltri-o-tolylphosphonium phosphate,
3,5-dinitrobenzyltri-m-tolylphosphonium chloride,
3,5-dinitrobenzyltri-m-tolylphosphonium bromide,
3,5-dinitrobenzyltri-m-tolylphosphonium iodide,
3,5-dinitrobenzyltri-m-tolylphosphonium acetate.acetic acid complex,
3,5-dinitrobenzyltri-m-tolylphosphonium phosphate,
3,5-dinitrobenzyltri-p-tolylphosphonium chloride,
3,5-dinitrobenzyltri-p-tolylphosphonium bromide.
3,5-dinitrobenzyltri-p-tolylphosphonium iodide,
3,5-dinitrobenzyltri-p-tolylphosphonium acetate.acetic acid complex,
3,5-dinitrobenzyltri-p-tolylphosphonium phosphate.
3-hydroxypropyltri-o-tolylphosphonium chloride,
3-hydroxypropyltri-o-tolylphosphonium bromide,
3-hydroxypropyltri-o-tolylphosphonium iodide,
3-hydroxypropyltri-o-tolylphosphonium acetate.acetic acid complex,
3-hydroxypropyltri-o-tolylphosphonium phosphate,
3-hydroxypropyltri-m-tolylphosphonium chloride,
3-hydroxypropyltri-m-tolylphosphonium bromide,
3-hydroxypropyltri-m-tolylphosphonium iodide,
3-hydroxypropyltri-m-tolylphosphonium acetate.acetic acid complex,
3-hydroxypropyltri-m-tolylphosphonium phosphate,
3-hydroxypropyltri-p-tolylphosphonium chloride,
3-hydroxypropyltri-p-tolylphosphonium bromide,
3-hydroxypropyltri-p-tolylphosphonium iodide,
3-hydroxypropyltri-p-tolylphosphonium acetate.acetic acid complex,
3-hydroxypropyltri-p-tolylphosphonium phosphate, or any combination thereof and the like.

The phosphonium catalysts can be prepared by dissolving the appropriate phosphine compound in a suitable solvent such as a hydrocarbon such as toluene, xylene or the like, adding equivalent moles of an alkyl halide and heating the mixture, usually at a temperature of from about 20° C. to about 130° C., preferably from about 25° C. to about 130° C., more preferably from about 50° C. to about 100° C. The mixture is reacted until the reaction is completed, usually after reacting for from about 1 to about 40, preferably from about 1 to about 35, more preferably from about 1 to about 30 hours. The product is cooled, separated and washed with additional solvent and then dried in a vacuum oven Any epoxy compound having an average of more than one vicinal epoxy group per molecule can be employed to produce advanced epoxy resins by the process of the present invention. While minor amounts of epoxy-containing compounds having an average of more than two vicinal epoxy groups per molecule can be employed, it is preferred that the epoxy compound have an average number of epoxy groups per molecule not in excess of about 2.

Suitable such epoxy-containing compounds include the glycidyl ethers or glycidyl esters or glycidyl amines or glycidyl thioethers of aromatic or aliphatic or cycloaliphatic compounds having an average of more than one reactive hydrogen atom per molecule, such as those compounds having an average of more than one aliphatic or aromatic or cycloaliphatic hydroxyl, carboxyl, thiol, or primary or secondary amino group per molecule and the like. Particularly suitable epoxy-containing compounds include, for example, the diglycidyl ethers of compounds containing two aliphatic hydroxyl groups per molecule or two aromatic hydroxyl groups per molecule or two cycloaliphatic hydroxyl groups per molecule or any combination thereof including such compounds as those having one aromatic hydroxyl group per molecule and the other being an aliphatic or cycloaliphatic hydroxyl group per molecule. Preferably, the epoxy-containing compound is a diglycidyl ether of biphenol, bisphenol A, bisphenol F, bisphenol K, bisphenol S, or the $C_1$–$C_4$ alkyl or halogen, preferably bromine, substituted derivatives thereof. Also, particularly suitable are the glycidyl esters of aliphatic, cycloaliphatic or aromatic carboxylic acids or acid anhydrides. Particularly suitable are the glycidyl esters of those acids or anhydrides having from about 2 to about 30, more suitably from about 2 to about 20, most suitably from about 2 to about 10, carbon atoms per molecule. Preferably, the glycidyl ester compounds include, for example, the glycidyl esters of glutaric acid, phthalic acid, hexahydrophthalic acid, succinic acid, maleic acid, pyromellitic acid, tetrahydrophthalic acid, adipic acid, combinations thereof and the like.

The reaction mixture or precatalyzed composition employed in the preparation of an advanced resin can also, if desired, contain minor amounts of a compound having an average of more than 2 vicinal epoxide groups per molecule. By the term "minor amounts", it is meant that such compounds are employed in amounts such that the resultant product does not result in a compound which is sufficiently crosslinked so as to render the resulting compound incapable of being further cured with a suitable epoxy resin curing agent, if the advanced resin is terminated in epoxy groups or with an epoxy resin if the advanced resin is terminated in a group containing hydrogen atoms reactive with a vicinal epoxide. Suitable such epoxy resins include, for example, the polyglycidyl ethers of phenolaldehyde novolac resins, alkyl or halogen substituted phenol-aldehyde novolac resins, alkyldiene-phenol resins, cycloalkyldiene-phenol resins, alkyldiene-substituted phenol resins, cycloalkyldiene-substituted phenol resins, combinations thereof and the like. Particularly suitable such epoxy resins include, for example, the polyglycidyl ethers of phenol-formaldehyde novolac resins, cresol-formaldehyde novolac resins, bromophenol-formaldehyde novolac resins, cyclopentadiene-phenol resins, dicyclopentadiene-phenol resins, higher oligomers of cyclopentadiene-phenol resins, combinations thereof and the like.

Suitable compounds having an average of more than one hydrogen atom reactive with an epoxide group per molecule which can be employed in the process of the present invention to react with the compound having an average of more than one vicinal epoxide group per molecule to produce an advanced resin include those compounds having an average or more than one, preferably an average of about 2 aromatic hydroxyl or thiol groups per molecule or an average of more than one, preferably an average of about 2 carboxyl groups per molecule. Particularly suitable such compounds include biphenol, alkyl or alkoxy or halogen substituted biphenol, bisphenols, alkyl or alkoxy or halogen substituted bisphenols, aliphatic dicarboxylic acids, cycloaliphatic dicarboxylic acids, aromatic dicarboxylic acids, or any combination thereof and the like. Preferably the compound having an average of more than one reactive hydrogen atom per molecule is biphenol, bisphenol A, bisphenol AP (1,1-bis(2-hydroxyphenyl)-1-phenylethane), bisphenol F, bisphenol K, bisphenol S, or the $C_1$–$C_4$ alkyl or halogen, preferably bromine, substituted derivatives thereof, glutaric acid, phthalic acid, hexahydrophthalic acid, succinic acid, maleic acid, pyromellitic acid, tetrahydrophthalic acid, adipic acid, combinations thereof and the like.

The reaction mixture can also, if desired, contain minor amounts of a compound having an average of more than two hydrogen atoms which are reactive with an epoxide group per molecule. By the term "minor amounts", it is meant that such compounds are employed in amounts such that the resultant product does not result in a compound which is sufficiently crosslinked so as to render the resulting compound incapable of being further cured with a suitable epoxy resin curing agent when the advanced resin is terminated in epoxide groups or a compound containing vicinal epoxide groups if the advanced resin is terminated in a group containing hydrogen atoms reactive with vicinal epoxide groups. Suitable such compounds include, for example, phenol-aldehyde novolac resins, alkyl or halogen substituted phenol-aldehyde novolac resins, alkyldiene-phenol resins, cycloalkyldiene-phenol resins, alkyldiene-substituted phenol resins, cycloalkyldiene-phenol resins combinations thereof and the like. Particularly suitable such compounds include phenol-formaldehyde novolac resins, cresol-formaldehyde resins, bromophenol-formaldehyde novolac resins, cyclopentadiene-phenol resins, combinations thereof and the like.

The epoxy resin and the reactive hydrogen-containing compound are employed in amounts which result in a compound terminated in either an epoxide group or a group containing a reactive hydrogen atom. The compounds are employed in amounts which provide a reactive hydrogen atom to epoxy group ratio suitably from about 0.1:1 to about 10:1, more suitably from about 0.2:1 to about 5:1, most suitably from about 0.3:1 to about 1:1. When the epoxy groups are in excess the resulting advanced resin is predominately terminated in epoxy groups. When the reactive hydrogen atoms are in excess, the resulting advanced resin is predominately terminated in hydrogen atoms.

Although the process of the present invention for preparing advanced epoxy resins can be conducted in a batch process, it is preferably conducted continuously in an extruder such as described by Heinemeyer and Tatum in U.S. Pat. No. 4,612,156 which is incorporated herein by reference in its entirety.

Suitable compounds containing an anhydride group which can be employed herein as a curing agent for epoxy resins include aliphatic, cycloaliphatic or aromatic acid anhydrides having suitably from about 4 to about 30, more suitably from about 4 to about 20, most suitably from about 4 to about 10, carbon atoms. Particularly suitable acid anhydrides include, for example, phthalic anhydride, succinic anhydride, hexahydrophthalic anhydride, methylhexahydrophthalic anhydride, glutaric anhydride, methyl bicyclo(2.2.1)heptene-2,3-dicarboxylic anhydride isomers (Nadic Methyl Anhydride available from Allied Chemical), maleic anhydride, pyromellitic anhydride, polyadipic acid anhydride, combinations thereof and the like.

When an acid anhydride is employed, it is employed in a mole ratio of acid anhydride to epoxy group suitably from about 0.4:1 to about 1.25:1, more suitably from about 0.5:1 to about 1.2:1, most suitably from about 0.6:1 to about 1.1:1.

Other suitable curing agents which can be employed herein in the curable compositions include. acid anhydrides and compounds containing an average of more than one, preferably more than two hydrogen atoms which are reactive with vicinal epoxide groups per molecule.

Suitable compounds containing an anhydride group which can be employed herein as a curing agent for vicinal epoxide-containing compounds or resins include aliphatic, cycloaliphatic or aromatic acid anhydrides having suitably from about 4 to about 30, more suitably from about 4 to about 20, most suitably from about 4 to about 10, carbon atoms. Particularly suitable acid anhydrides include, for example, phthalic anhydride. succinic anhydride, hexahydrophthalic anhydride. methylhexahydrophthalic anhydride, glutaric anhydride, methyl bicyclo(2.2.1)heptene-2,3-dicarboxylic anhydride isomers (Nadic Methyl Anhydride available from Allied Chemical), maleic anhydride, pyromellitic anhydride, polyadipic acid anhydride, combinations thereof and the like.

Suitable compounds containing groups reactive with a vicinal epoxide which can be employed as curing agents herein include, aliphatic polyamines, cycloaliphatic polyamines, aromatic polyamines, compounds containing an average of more than two aromatic hydroxyl groups per molecule such as phenol-aldehyde novolac resins, alkyl or halogen substituted phenol-aldehyde novolac resins, alkyldiene-phenol resins, cycloalkyldiene-phenol resins, alkyldiene-substituted phenol resins, cycloalkyldiene-phenol resins, combinations thereof and the like. Particularly suitable such compounds include ethylenediamine. diethylenetriamine, triethylenetetramine, tetraethylenepentamine, isophoronediamine, metaphenylenediamine, methylenedianiline, diaminodiphenyl sulfone, phenol-formaldehyde novolac resins, cresol-formaldehyde resins. bromophenolformaldehyde novolac resins, cyclopentadiene-phenol resins, combinations thereof and the like.

The curing agent are employed in amounts which are suitable to cure the vicinal epoxide-containing resin or compound. Usually from about 0.75 to about 1.25, preferably from about 0.85 to about 1.15, more preferably from about 0.95 to about 1.05 equivalents of curing agent per epoxide group is employed.

The compositions of the present invention can contain or the process of the present invention can be conducted in the presence of any solvent or diluent which is essentially inert to the composition at ordinary temperature. Suitable such solvents or diluents include, for example, alcohols, esters, glycol ethers, ketones, aliphatic and aromatic hydrocarbons. combinations thereof and the like. Particularly suitable such solvents or diluents include, for example, isopropanol, n-butanol, tertiary butanol, acetone, methyl ethyl ketone, methyl isobutyl ketone, butylene glycol methyl ether, ethylene glycol methyl ether. ethylene glycol ethyl ether, ethylene glycol n-butyl ether, ethylene glycol phenyl ether, diethylene glycol n-butyl ether, diethylene glycol ethyl ether, diethylene glycol methyl ether, propylene glycol methyl ether, propylene glycol ethyl ether, propylene glycol n-butyl ether, propylene glycol phenyl ether, dipropylene glycol methyl ether, dipropylene glycol n-butyl ether, tripropylene glycol methyl ether, any combination thereof and the like.

The compositions and process can employ the solvent or diluent in any desired proportion to provide suitable dilution, suitable solution viscosity and the like. Particularly suitable amounts include, for example, from about 0.1 to about 90, more suitably from about 0.5 to about 50, most suitably from about 1 to about 30, percent by weight based upon the weight of the epoxy-containing reactant.

When an extruder is employed in the process for preparing advanced epoxy resins, the amount of solvent will usually be less than about 10, preferably less than about 5, more preferably less than about 3 percent by weight of the combined weight of epoxy-containing compound, compound reactive with the epoxy-containing compound and solvent. In the event that it is desired that the resultant product contain a larger amount of solvent, then additional amounts can be added after the advanced resin has been prepared in the extruder.

The following examples are illustrative of the invention, but are not to be construed as to limiting the scope thereof in any manner.

The following analytical methods are employed in the examples and comparative experiments.

The EEW is determined by potentiometric titration of the epoxide group with hydrogen bromide generated in-situ by the reaction of perchloric acid with tetrabutylammonium bromide in acetic acid solution.

The VISCOSITY is determined by means of an I.C.I. cone and plate viscometer at 200° C.

The residual PHENOLIC HYDROXYL content is determined by a spectroscopic procedure in which the phenolic OH is converted to its phenate salt and the absorbance measured with an ultraviolet spectrophotometer.

The MOLECULAR WEIGHT is determined by gel permeation chromatography using a Waters 150 gel permeation chromatograph, GPC, equipped with two Zorbax PSM 60/100 columns in series. The solvent is tetrahydrofuran and the flow rate is 1 ml/minute. Polystyrene resins are used as calibration standards.

The PERCENT ACTIVE CATALYST is determined by dissolving 0.25 g of resin sample in methylene chloride to a total volume of 25 ml. To a 5 ml aliquot is added 15 ml of methylene chloride and 1 ml of a 0.1% aqueous solution of methyl orange indicator in a 2 oz (59.15 ml) bottle. This mixture is shaken for one minute, then allowed to stand for 5 minutes. A 10 ml aliquot is filtered into a Klett tube, which is placed in a Klett colorimeter. The colorimeter measures the color intensity which is directly proportional to active catalyst (phosphonium cation) levels. Catalyst concentration is then calculated based on the ppm active catalyst per Klett unit.

EXAMPLE 1

Preparation of advanced epoxy resin employing tri(p-toly)phosphine as catalyst

Into a one liter. 5 necked glass reactor equipped with a mechanical stirrer a thermometer connected to a temperature controller and a heating mantle, is charged 396 gms (2.104 equivalents) of a diglycidyl ether of bisphenol A having an epoxide equivalent weight (EEW) of 182.7. The reactor is purged with nitrogen and the resin is warmed to 80° C. Bisphenol A, 204 gms (1.790 equivalents) is then added and mixed for 15 minutes at 80° C. Tri(p-tolyl)phosphine, 0.245 gms (0.800 milliequivalents) is added to the resin/bisphenol A slurry and the temperature is gradually increased to 150° C. over a 45 minute period. Heating is turned off at 150° C. and an exotherm is allowed to take place to 190° C. Air cooling is used to control the exotherm temperature to less than 200° C. The cook temperature is maintained at 190° C. for 4 hours, during which time samples are taken for product analyses. After reaction completion, the resin is poured out and flaked on aluminum foil. The product is characterized in Table I.

EXAMPLE 2

Preparation of advanced epoxy resin employing tri(o-tolyl)phosphine as catalyst

The procedure described in in Example 1 is employed except that 0.245 gms (0.800 milliequivalents) of tri(o-tolyl)phosphine is used as the catalyst.

COMPARATIVE EXPERIMENT A

The procedure described in in Example 1 is employed except that 0.201 gms (0.800 milliequivalents) of triphenylphosphine is used as the catalyst.

COMPARATIVE EXPERIMENT B

The procedure described in Example 1 is employed except that 0.160 gms (0.800 milliequivalents) of tri(n-butyl)phosphine is used as the catalyst.

Results of samples of Examples 1 and 2 and Comparative Experiments A and B taken 1 hour after exotherm are provided in Table I.

Results of samples of Examples 1 and 2 and Comparative Experiments A and B taken 3 hour after exotherm are provided in Table II.

The data clearly shows that tritolylphosphines are unique, superior catalysts. They provide a faster reaction rate, reaching targeted EEW (2,000) in the shortest time The unreacted Phenolic OH is also very low compared to other catalysts, indicating high conversion and good selectivity. In addition, they provide good product EEW and viscosity stability as indicated by the data in Table 2 (taken 3 hours after the exotherm). The triphenylphosphine catalyst (Comp.

TABLE I

| Ex. | Catalyst | EEW | Phenolic OH (ppm) | Viscosity, cps (Pa · s) | MWw |
| --- | --- | --- | --- | --- | --- |
| 1 | Tri(p-tolyl) phosphine | 1,964 | 760 | 8,250 (8.25) | 9,700 |
| 2 | Tri(o-tolyl) phosphine | 2,040 | 552 | 8,625 (8.625) | 10,664 |
| Comp. Exp. A* | Triphenyl phosphine | 1,451 | 4,100 | 1,750 (1.75) | 5,300 |
| Comp. Exp. B* | Tri(n-butyl) phosphine | 1,747 | 1,170 | 7,500 (7.5) | 9,400 |

*Not an example of the present Invention.

TABLE II

| Ex. | Catalyst | EEW | Phenolic OH (ppm) | Viscosity, cps (PA · s) | MWw |
| --- | --- | --- | --- | --- | --- |
| 1 | Tri p-tolyl phosphine | 2,237 | 650 | 10,000 (10) | 9,700 |
| 2 | Tri o-tolyl phosphine | 2,117 | 424 | 10,000 (10) | 10,664 |
| Comp. Exp. A* | Tri phenyl phosphine | 1,561 | 3,500 | 2,000 (2) | 5,300 |
| Comp. Exp. B* | Tri n-butyl phosphine | 2,201 | 870 | 15,000 (15) | 9,400 |

*Not an example of the present Invention.

Exp. A) deactivates prematurely at high temperatures and never reaches the targeted EEW and viscosity, even after 3 hours reaction time. On the other hand, the tri(n-butyl)phosphine catalyst (Comp. Exp. B) does reach the targeted EEW but residual phenolic OH is much higher, indicating poor selectively and branching side-reactions involving aliphatic OH and epoxide groups. This is further evidenced by the excessive resin viscosity build after 3 hrs cook time.

EXAMPLE 3

A. Preparation of ethyltri(o-tolyl)phosphonium iodide catalyst

Into a 50 milliliter glass reactor equipped with a thermometer connected to a temperature controller, a heating mantle a condenser and a magnetic stirring bar, are charge 5 gms (0.0164 mole) of tri-o-tolylphosphine and 23 gms of toluene. The slurry is heated to 27° C. then 3.08 gms (0.0197 mole) of ethyl iodide is added. This reaction mass is heated to 70° C. and maintained for 17 hours, then heated to 100° C. and maintained for 9 hours, then cooled to 70° C. and maintained for 15 hours, then cooled to 26° C. This mixture is filtered and washed with 6 gms of toluene. After vacuum drying, 1.6 gms of ethyltri(otolyl)phosphonium iodide is obtained which has a melting point of 247° C. to 250° C.

B. Advancement with ethyltri(o-tolyl)phosphonium iodide catalyst

Into a liter, 5 necked glass reactor equipped with a mechanical stirrer, a thermometer connected to a temperature controller and a heating mantle, is charged 396 gms (2.104 equivalents) of a diglycidyl ether of bisphenol A having an EEW of 182.7. The reactor is purged with nitrogen and the resin warmed to 80° C. Bisphenol A, 204 gms (1.790 equivalents), is then added and mixed for 15 minutes at 80° C. Ethyl tri(p-tolyl) phosphonium iodide, 0.370 gms (0.560 milliequivalents) is added to the resin/bisphenol A slurry and the temperature is gradually increased to 150° C. over a 45 minutes period. Heating is turned off at 150° C. and an exotherm is allowed to take place to 190° C. Air cooling is used to control the exotherm temperature to less than 200° C. The cook temperature is maintained at 190° C. for 4 hours while samples are taken for product analyses After reaction completion, the resin is poured out and flaked on aluminum foil.

EXAMPLE 4

A Preparation of ethyl-tri-p-tolylphosphonium bromide catalyst

Into a 1 liter glass reactor equipped with a thermometer connected to a temperature controller, a heating mantle, a condenser and a magnetic stirring bar, are charged 250 gms (0.822 mole) of tri-p-tolylphosphine and 600 gms of xylene. The slurry is heated to 32° C. then 117 gms (1.073 mole) of ethyl bromide is added. This reaction mass is maintained at 32° C. for 1.5 hours, then heated to 45° C. and maintained at that temperature for 21 hrs, then heated to 65° C. and maintained at that temperature for 2 hours, then heated to 90° C. and maintained at that temperature for 2 hours. This mixture is cooled to 32° C., then 43.9 gms of ethyl bromide is added and mixed for 1 hour, then heated to 45° C. and maintained at that temperature for 18 hours, then cooled to 33° C. and an additional 15.7 gms of ethyl bromide is added and the temperature is maintained for 1 hour. The reaction mass is then heated to 45° C. and maintained at that temperature for 2 hours. The reaction material is then cooled to 50° C. and filtered. The solid phosphonium salt is washed with 200 gms of xylene resulting in 220 gms of clean phosphonium salt. The phosphonium salt has a melting point of 222°-224° C.

B. Advancement with ethyltri(p-tolyl)phosphonium bromide catalyst

The procedure described in in Example 3B is employed except that 0.233 gms (0.560 milliequivalents) of ethyltri(p-tolyl)phosphonium bromide is used as the catalyst.

COMPARATIVE EXPERIMENT C

The procedure described in in Example 3B is employed except that 0.236 gms (0.560 milliequivalents) of ethyltriphenyl phosphonium iodide is used as the catalyst.

COMPARATIVE EXPERIMENT D

The procedure described in in Example 3 is employed except that 0.160 gms (0.560 milliequivalents) of tetrabutyl phosphonium acetate.acetic acid complex is used as the catalyst.

Table III shows to peak exotherm temperatures and the rate of exotherm.

Table IV provides data obtained 30 minutes after the peak exotherm temperature.

Table V provides data obtained 4 hours after the peak exotherm temperature.

The catalytic activity of the various catalysts is shown in Table VI.

TABLE III

| Ex. | Catalyst | Peak Exotherm Temperature, °C. | Time to Reach Peak Exotherm |
|---|---|---|---|
| 3 | Ethyltri(o-tolyl) phosphonium iodide | 190 | 30 |
| 4 | Ethyltri(p-tolyl) phosphonium bromide | 198 | 35 |
| Comp. Exp. C* | Ethyltriphenyl phosphonium iodide | 185 | 60 |
| Comp. Exp. D* | Tetra n-butyl phosphonium acetate.HAC | 180 | 70 |

*Not an example of the present invention.

The peak exotherm temperature and the rate of exotherm are typically good indicators of a catalyst's potency and reaction initiation rate. As shown in Table III, the tritolylphosphonium salts exothermed much faster and to higher peak exotherm temperature than catalysts shown in the comparative experiments.

TABLE IV

| | | (30 minutes after exotherm) | | |
|---|---|---|---|---|
| Ex. | Catalyst | EEW | Phenolic OH (ppm) | Viscosity cps (Pa · s) |
| 3 | Ethyltri-o-tolyl phosphonium iodide | 1,976 | 881 | 7,500 (7.5) |
| 4 | Ethyltri-p-tolyl phosphonium bromide | 1,976 | 896 | 7,000 (7.0) |
| Comp. Exp. C* | Ethyltriphenyl phosphonium iodide | 1,843 | 1,603 | 5,000 (5.0) |
| Comp. Exp. D* | Tetra n-butyl phosphonium acetate.HAC | 1,951 | 1,200 | 7,500 (7.5) |

*Not an example of the present invention.

TABLE V

| | | (4 hours after exotherm) | | |
|---|---|---|---|---|
| Ex. | Catalyst | EEW | Phenolic OH (ppm) | Viscosity cps (Pa · s) |
| 3 | Ethyltri-o-tolyl phosphonium iodide | 2,189 | 456 | 12,250 (12.25) |
| 4 | Ethyltri-p-tolyl phosphonium bromide | 2,213 | 299 | 13,000 (13.0) |
| Comp. Exp. C* | Ethyltriphenyl phosphonium iodide | 2,103 | 754 | 10,000 (10.0) |
| Comp. Exp. D* | Tetra n-butyl phosphonium acetate.HAC | 2,224 | 431 | 16,375 (16.375) |

*Not an example of the present invention.

The data in Table IV clearly shows the the tri tolyl phosphoniums are much more efficient catalysts, showing very low residual Phenolic OH, indicating high reaction conversion and good selectivity. For comparison, the ethyltriphenylphosphonium iodide catalyst did not reach the same level of residual Phenolic OH until 4 hrs reaction time (see Table V). In addition, ethyltriphenyl phosphonium iodide never did reach the very low residual Phenolic OH attained by the tritolylphosphonium salts. This is very important in high molecular weight resin manufacturing. The tritolyl phosphonium salts also show good product EEW and viscosity stability as indicated by data in Table III (taken 4 hours after the exotherm). The ethyl triphenyl phosphonium iodide catalyst did not reach the desired viscosity value of 12,000 to 13,000 cps (12 to 13 Pa.s). On the other hand, the tetra n-butyl phosphonium catalyst continues to react and build too high viscosity, indicating branching reactions and poor selectively.

TABLE VI

| | | (Catalyst Activity) | | | | |
|---|---|---|---|---|---|---|
| | | Percent Active Catalyst at Indicated Time after Exotherm | | | | |
| Ex. | Catalyst | 30 min | 60 min | 120 min | 180 min | 240 min |
| Ex. 3 | Et(o-To)3 P+ I− | 55 | 55 | 30 | 15 | ND |
| Ex. 4 | Et(p-To)3 P+ Br− | 64 | 64 | 51 | 32 | 16 |
| Comp. Exp. C* | Et(Ph)3 P+ I− | 24 | ND | ND | ND | ND |
| Comp. Exp. D* | (Bu)4 P+ Ac−.HAC | 87 | 82 | 78 | 67 | 60 |

*Not an example of the present invention.

Table VI indicates that the tritolylphosphonium salts are ideal resin advancement catalysts in that they deactivate after the desired product EEW and viscosity are reached as indicated by the relatively low reactivity values at the end of 3 and 4 hours after the peak exotherm. In contrast, ethyltriphenyl phosphonium iodide deactivates prematurely as indicated by the relatively low reactivity value after only 30 minutes after the peak exotherm temperature, resulting in high residual phenolic OH and low viscosity build. On the other hand, the excessive viscosity build (Table V) which is observed with tetrabutyl phosphonium acetate.acetic acid complex is due to its inability to deactivate after the desired reaction is completed, leading to branching side-reactions. This is indicated in Table VI by the remaining high reactivity value at the end of 4 hours after the peak exotherm

COMPARATIVE EXPERIMENT E

A. The benzyltriphenyl phosphonium chloride catalyst employed in this comparative experiment is purchased from Aldrich Chemical Company B. Preparation of advanced epoxy resin using benzyltriphenyl phosphonium chloride as a catalyst Into a 1 liter 5 necked glass reactor equipped with a mechanical stirrer, a thermometer connected to a temperature controller and a heating mantle, is charged 329.25 gms (1.7607 equivalents) of a diglycidyl ether of bisphenol A having an EEW of 187 and 170.75 gms (1.4978 equivalents) of bisphenol A. The reactor is purged with nitrogen and the resin mixture warmed to 80° C. Benzyltriphenyl phosphonium chloride 0.38 gm (0.978 millimole) dissolved in methanol (42.3% n.v.) is added to the resin/bisphenol A slurry and the temperature is gradually increased to 150° C. over a 41 minute period. Heating is turned off at 150° C. and an exotherm is allowed to take place to 193° C. Air cooling is used to control the exotherm temperature to 193° C. The reaction temperature is maintained at 190° C. for 4 hours while samples are taken for product analyses. After reaction completion, the resin is poured out on aluminum foil. The characteristics of the advanced epoxy resin are given in Table VII.

COMPARATIVE EXPERIMENT F

A. Preparation of 4-methoxybenzyltriphenylphosphonium acetate.acetic acid complex catalyst Into a 50 milliliter glass reactor equipped with a thermometer connected to a temperature controller, a heating mantle, a condenser and a magnetic stirring bar, is charged 9 gms (0.0215 mole) of 4-methoxybenzyl triphenyl phosphonium chloride and 25 gms of acetic acid. The mixture is heated to 40° C. then 1 gm (0.0588 mole) of ammonia is added. This reaction mass is heated to 80° C. and maintained there for 1.17 hours, then heated to 100° C. and maintained thereat for 18 hours, then heated to 110° C. and maintained thereat 4.8 hours, and then cooled to 30° C. To this is added 40 g of benzene and the contents let stand overnight to settle the solids, then the liquid is removed by decantation and vacuum distillation to obtain 7.8 g of product having a melting point of 121° C. to 130° C.

B. Preparation of advanced epoxy resin using 4-methoxybenzyltriphenylphosphonium acetate.acetic acid complex as a catalyst Into a 1 liter 5 necked glass reactor equipped with a mechanical stirrer, a thermometer connected to a temperature controller and a heating mantle, is charged 329.25 gms (1.7607 equivalents) of a diglycidyl ether of bisphenol A having an EEW of 187 and 170.75 gms (1.4978 equivalents) of bisphenol A.

The reactor is purged with nitrogen and the resin mixture warmed to 80° C.

4-Methoxybenzyltriphenylphosphonium acetate.acetic acid complex 0.49 gm (0.975 millimole) dissolved in methanol (47.9% n.v.) is added to the resin/bisphenol A slurry and the temperature is gradually increased to 150° C. over a 43 minute period. Heating is turned off at 150° C. and an exotherm is allowed to take place to 189° C. Air cooling is used to control the exotherm temperature to 189° C. The reaction temperature is maintained at 190° C. for 4 hours while samples are taken for product analyses. After reaction completion, the resin is poured out on aluminum foil. The characteristics of the advanced epoxy resin are given in Table VII.

EXAMPLE 5

A. Preparation of advanced epoxy resin using benzyltri-p-tolyl phosphonium chloride catalyst Into a 50 milliliter glass reactor equipped with a thermometer connected to a temperature controller, a heating mantle, a condenser and a magnetic stirring bar, is charged 4.82 gms (0.0157 mole) of tri-p-tolylphosphine and 23 gms of toluene. The slurry is heated to 35° C. then 2.4 gms (0.01–7 mole) of benzyl chloride is added. This reaction mass is heated to 40° C. in 45 minutes, then heated to 100QC for 4.5 hours, then cooled to 28° C. The mixture s filtered and washed with 8 grams of toluene and then vacuum dried. There is obtained 8 gms of catalyst which has a melting point of >250° C. and a chemical shift of 22.2 ppm (phosphoric acid reference).

B. Preparation of advanced epoxy resin using benzyltri-p-tolyl phosphonium chloride as a catalyst Into a 1 liter 5 necked glass reactor equipped with a mechanical stirrer, a thermometer connected to a temperature controller and a heating mantle, is charged 329.24 gms (1.7607 equivalents) of a diglycidyl ether of bisphenol A having an EEW of 187 and 170.71 gms (1.4975 equivalents) of bisphenol A. The reactor is purged with nitrogen and the resin mixture warmed to 80° C. Benzyltri-p-tolyl phosphonium chloride 0.42 gm (0.975 millimole) dissolved in methanol (25.4% nonvolatiles (n.v.) by weight) is added to the resin/bisphenol A slurry and the temperature is gradually increased to 150° C. over a 42 minute period. Heating is turned off at 150° C. and an exotherm is allowed to take place to 197° C. Air cooling is used to control the exotherm temperature to 197° C. The reaction temperature is maintained at 190° C. for 4 hours while samples are taken for product analyses. After reaction completion, the resin is poured out on aluminum foil. The characteristics of the advanced epoxy resin are given in Table VII.

EXAMPLE 6

A. Preparation of benzyltri-p-tolyl phosphonium bromide catalyst

Into a 50 milliliter glass reactor equipped with a thermometer connected to a temperature controller, a heating mantle, a condenser and a magnetic stirring bar, is charged 5.39 gms, (0.0177 mole) of tri-p-tolyl phosphine and 23 gms of toluene. The slurry is heated to 35° C., then 3.6 gms (0.0211 mole) of benzyl bromide is added. This reaction mass is heated to 40° C. in 0.25 hour and maintained for 4 hours, then cooled to 29° C. and the resulting phosphonium salt collected by filtration. The salt is washed with 25 gms of toluene then vacuum dried. There is obtained 6.7 gms of catalyst which has a melting point of >250° C. and a chemical shift of 22.1 ppm (phosphoric acid reference).

B. Preparation of advanced epoxy resin using benzyltri-p-tolyl phosphonium bromide as a catalyst Into a 1 liter 5 necked glass reactor equipped with a mechanical stirrer, a thermometer connected to a temperature controller and a heating mantle, is charged 329.26 gms (1.7607 equivalents) of a diglycidyl ether of bisphenol A having an EEW of 187 and 170.75 gms (1.4978 equivalents) of bisphenol A. The reactor is purged with nitrogen and the resin mixture warmed to 80° C. Benzyltri-p-tolyl phosphonium bromide. 0.46 gm (0.968 millimole) dissolved in methanol (26.5% n.v.) is added to the resin/bisphenol A slurry and the temperature is gradually increased to 150° C. over a 48 minute period. Heating is turned off at 150° C. and an exotherm is allowed to take place to 197° C. Air cooling is used to control the exotherm temperature to 197° C. The reaction temperature is maintained at 190° C. for 4 hours while samples are taken for product analyses. After reaction completion, the resin is poured out on aluminum foil. The characteristics of the advanced epoxy resin are given in Table VII.

EXAMPLE 7

A. Preparation of benzyltri-p-tolyl phosphonium iodide catalyst

Into a 50 milliliter glass reactor equipped with a thermometer connected to a temperature controller, a heating mantle, a condenser and a magnetic stirring bar, is charged 5 gms (0.0164 mole) of tri-p-tolylphosphine and 23 gms of toluene. The slurry is heated to 35° C. then 4.3 gms (0.0177 mole) of benzyl iodide is added. This reaction mass is heated to 40° C. in 15 minutes and maintained for 16 hours then cooled to 26° C. and the resulting phosphonium salt collected by filtration, then vacuum dried. There is obtained 3.6 gms of catalyst which has a melting point of 210° C.-218° C. and a chemical shift of 28.5 ppm (phosphoric acid reference).

B. Preparation of advanced epoxy resin using benzyltri-p-tolyl phosphonium iodide a a catalyst Into a 1 liter 5 necked glass reactor equipped with a mechanical stirrer, a thermometer connected to a temperature controller and a heating mantle, is charged 329.25 gms (1.7607 equivalents) of a diglycidyl ether of bisphenol A having an EEW of 187 and 170.75 gms (1.4978 equivalents) of bisphenol A. The reactor is purged with nitrogen and the resin mixture warmed to 80° C. Benzyltri-p-tolyl phosphonium iodide, 0.51 gm (0.977 millimole) dissolved in chloroform (37% n.v.) is added to the resin/bisphenol A slurry and the temperature is gradually increased to 150° C. over a 45 minute period. Heating is turned off at 150° C. and an exotherm is allowed to take place to 200° C. Air cooling is used to control the exotherm temperature to 200° C. The reaction temperature is maintained at 200° C. for 4 hours while samples are taken for product analyses. After reaction completion, the resin is poured out on aluminum foil The characteristics of the advanced epoxy resin are given in Table VII.

EXAMPLE 8

A. Preparation of ethyltri-p-tolylphosphonium iodide catalyst

Into a 50 milliliter glass reactor equipped with a thermometer connected to a temperature controller, a heating mantle, a condenser and a magnetic stirring bar, is charged 5 gms (0.0164 mole) of tri-p-tolyl phosphine and 25 gms of toluene. The slurry is heated to 25° C., then 3 gms (0.0192 mole) of ethyl iodide is added. This reaction mass is heated to 60° C. and maintained for 14 hours, then cooled and the resulting phosphonium salt collected by filtration. After vacuum drying, there is obtained 6.85 gms of catalyst which has a melting point of 184°-187° C. and a chemical shift of 24.7 ppm (phosphoric acid reference).

B. Preparation of advanced epoxy resin using ethyltri-p-tolylphosphonium iodide as a catalyst Into a 1 liter 5 necked glass reactor equipped with a mechanical stirrer, a thermometer connected to a temperature controller and a heating mantle, is charged 329.25 gms (1.7607 equivalents) of a diglycidyl ether of bisphenol A having an EEW of 187 and 170.75 gms (1.4978 equivalents) of bisphenol A. The reactor is purged with nitrogen and the resin mixture warmed to 85° C. Ethyltri-p-tolylphosphonium iodide 0.44 gm (0.974 millimole) dissolved in methanol (70% n.v.) is added to the resin/bisphenol A slurry and the temperature is gradually increased to 150° C. over a 50 minute period. Heating is turned off at 150° C. and an exotherm is allowed to take place to 191° C. Air cooling is used to control the exotherm temperature to 191° C. The reaction temperature is maintained at 190° C. for 4 hours while samples are taken for product analyses. After reaction completion, the resin is poured out on aluminum foil. The characteristics of the advanced epoxy resin are given in Table VII.

A. Preparation of ethyltri-o-tolyl phosphonium iodide catalyst

Into a 50 milliliter glass reactor equipped with a thermometer connected to a temperature controller, a heating mantle, a condenser and a magnetic stirring bar, is charged 5 gms (0.0164 mole) of tri-o-tolyl phosphine and 23 gms of toluene. The slurry is heated to 27° C. then 3.08 gms (0.0197 mole) of ethyl iodide is added. This reaction mass is heated to 70° C. and maintained for 15 hour,s then cooled to 26° C. and the resulting phosphonium salt collected by filtration. The salt is washed with 6 gms of toluene then vacuum dried. There is obtained 1.6 gms of catalyst which has a melting point of 247°-250° C. and a chemical shift of 28.5 ppm (phosphoric acid reference).

B Preparation of advanced epoxy resin using ethyltri-o-tolyl phosphonium iodide as a catalyst Into a 1 liter 5 necked glass reactor equipped with a mechanical stirrer, a thermometer connected to a temperature controller and a heating mantle, is charged 329.25 gms (1.7607 equivalents) of a diglycidyl ether of bisphenol A having an EEW of 187 and 170.75 gms (1.4978 equivalents) of bisphenol A. The reactor is purged with nitrogen and the resin mixture warmed to 80° C. Ethyltri-o-tolyl phosphonium iodide 0.45 gm (0.978 millimole) dissolved in methanol (14.2% n.v.) is added to the resin/bisphenol A slurry and the temperature is gradually increased to 150° C. over a 45 minute period. Heating is turned off at 150° C. and an exotherm is allowed to take place to 192° C. Air cooling is used to control the exotherm temperature to 192° C. The reaction temperature is maintained at 190° C. for 4 hours while samples are taken for product analyses After reaction completion, the resin is poured out on aluminum foil. The characteristics of the advanced epoxy resin are given in Table VII.

EXAMPLE 10

A. Preparation of ethyltri-m-tolyl phosphonium iodide catalyst

Into a 50 milliliter glass reactor equipped with a thermometer connected to a temperature controller, a heating mantle, a condenser and a magnetic stirring bar, is charged 5.49 gms (0.0181 mole) of tri-m-tolyl phosphine and 25 gms of toluene. The slurry is heated to 40° C., then 3.38 gms (0.0217 mole) of ethyl iodide is added. This reaction mass is heated to 40° C. and maintained for 16 hours, then heated to 70° C. and maintained for 4 hours, then cooled to 30° C. and the resulting phosphonium salt collected by filtration. After vacuum drying, there is obtained 5.8 gms of catalyst which has a melting point of >250° C. and a chemical shift of 25.7 ppm (phosphoric acid reference).

B. Preparation of advanced epoxy resin using ethyltri-m-tolyl phosphonium iodide as a catalyst Into a 1 liter 5 necked glass reactor equipped with a mechanical stirrer, a thermometer connected to a temperature controller and a heating mantle, is charged 329.25 gms (1.7607 equivalents) of a diglycidyl ether of bisphenol A having an EEW of 187 and 170.75 gms (1.4978 equivalents) of bisphenol A. The reactor is purged with nitrogen and the resin mixture warmed to 80° C. Ethyltri-m-tolyl phosphonium iodide 0.45 gm (0.978 millimole) dissolved in methanol (33.3% n.v.) is added to the resin/bisphenol A slurry and the temperature is gradually increased to 150° C. over a 47 minute period. Heating is turned off at 150° C. and an exotherm is allowed to take place to 193° C. Air cooling is used to control the exotherm temperature to 193° C. The reaction temperature is maintained at 190° C. for 4 hours while samples are taken for product analyses. After reaction completion, the resin is poured out on aluminum foil. The characteristics of the advanced epoxy resin are given in Table VII.

EXAMPLE 11

A. Preparation of 3-methoxybenzyltri-p-tolylphosphonium chloride catalyst

Into a 50 milliliter glass reactor equipped with a thermometer connected to a temperature controller, a heating mantle, a condenser and a magnetic stirring bar, is charged 5 gms (0.0164 mole) of tri-p-tolyl phosphine and 25 gms of toluene. The slurry is maintained at 25° C. then 3 gms (0.0191 mole) of 3-methoxybenzyl chloride is added. This reaction mass is maintained at 25° C. for 15 hours, then heated to 70° C. and maintained for 2 hours, then cooled to 90° C. and maintained for 2 hours, then cooled to 70° C. and the resulting phosphonium salt collected by filtration. The salt is washed with 5 gms of toluene then vacuum dried. There is obtained 1.2 gms of catalyst which has a melting point of >250° C. and a chemical shift of 22.1 ppm (phosphoric acid reference).

B. Preparation of advanced epoxy resin using 3-methoxybenzyltri-p- tolylphosphonium chloride as a catalyst Into a 1 liter 5 necked glass reactor equipped with a mechanical stirrer, a thermometer connected to a temperature controller and a heating mantle, is charged 329.25 gms (1.7607 equivalents) of a diglycidyl ether of bisphenol A having an EEW of 187 and 170.75 gms (1.4978 equivalents) of bisphenol A. The reactor is purged with nitrogen and the resin mixture warmed to 80° C. 3-Methoxybenzyltri-p-tolylphosphonium chloride, 0.45 gm (0.978 millimole) dissolved in methanol (50% n.v.) is added to the resin/bisphenol A slurry and the temperature is gradually increased to 150° C. over a 46 minute period. Heating is turned off at 150° C. and an exotherm is allowed to take place to 195° C. Air cooling is used to control the exotherm temperature to 195° C. The reaction temperature is maintained at 190° C. for 4 hours while samples are taken for product analyses. After reaction completion, the resin is poured out on aluminum foil. The characteristics of the advanced epoxy resin are given in Table VII.

EXAMPLE 12

A. Preparation of ethyltri-p-tolyl phosphonium bromide catalyst

Into a 50 milliliter glass reactor equipped with a thermometer connected to a temperature controller, a heating mantle, a condenser and a magnetic stirring bar, is charged 15 gms (0.0473 mole) of tri-p-tolyl phosphine and 40 gms of xylene. The slurry is heated to 30° C., then 7 gms (0.0642 mole) of ethyl bromide is added. This reaction mass is heated to 45° C. in 1.17 hours and maintained for 21.4 hours, then cooled to 65° C. and maintained for 2.47 hours, then heated to 90° C., then maintained for 2.42 hours at that temperature, then cooled to 25° C. Then 1.5 gm (0.0138 mole) of ethyl bromide is added and maintained at 25C for 0.75 hour, then heated to 45° C. and maintained at that temperature for 16.58 hours, then heated to 70° C. and maintained at that temperature for 1.5, then cooled to 48° C. and the resulting phosphonium salt collected by filtration. After vacuum drying, there is obtained 12.8 gms of catalyst which has a melting point of 213°-220° C. and a chemical shift of 24.6 ppm (phosphoric acid reference).

B. Preparation of advanced epoxy resin using ethyltri-p-tolyl phosphonium bromide as a catalyst Into a 1 liter 5 necked glass reactor equipped with a mechanical stirrer, a thermometer connected to a temperature controller and a heating mantle, is charged 329.25 gms (1.7607 equivalents) of a diglycidyl ether of bisphenol A having an EEW of 187 and 170.75 gms (1.4978 equivalents) of bisphenol A. The reactor is purged with nitrogen and the resin mixture warmed to 80° C. Ethyltri-p-tolylphosphonium bromide, 0.39 gm (0.951 millimole) dissolved in methanol (30% n.v.) is added to the resin/bisphenol A slurry and the temperature is gradually increased to 150° C. over a 40 minute period. Heating is turned off at 150° C. and an exotherm is allowed to take place to 199° C. Air cooling is used to control the exotherm temperature to 199° C. The reaction temperature is maintained at 190° C. for 4 hours while samples are taken for product analyses. After reaction completion, the resin is poured out on aluminum foil. The characteristics of the advanced epoxy resin are given in Table VII.

EXAMPLE 13

A. Preparation of 4-methylbenzyltri-p-tolylphosphonium bromide catalyst

Into a 100 milliliter glass reactor equipped with a thermometer connected to a temperature controller, a heating mantle, a condenser and a magnetic stirring bar, is charged 15 gms (0.0493 mole) of tri-p-tolyl phosphine and 40 gms of xylene. The slurry is heated to 63° C. then 9.3 gms (0.0594 mole) of 4-methoxy benzyl chloride is added. This reaction mass is heated to 60° C. and maintained at that temperature for 1 hour, then heated to 95C and maintained at that temperature for 1 hour, them heated to 130C and maintained at that temperature for 4 hours, hen cooled to 80C and maintained at that temperature for 14.5 hours, then cooled to 50° C. and the resulting phosphonium salt collected by filtration. After vacuum drying, there is obtained 20.7 gms of catalyst which has a melting point of 254°-257° C. and a chemical shift of 21.3 ppm (phosphoric acid reference).

B. Preparation of advanced epoxy resin using 4-methylbenzyltri-p-tolylphosphonium bromide as a catalyst Into a 1 liter 5 necked glass reactor equipped with a mechanical stirrer, a thermometer connected to a temperature controller and a heating mantle, is charged 329.25 gms (1.7607 equivalents) of a diglycidyl ether of bisphenol A having an EEW of 187 and 170.75 gms (1.4978 equivalents) of bisphenol A. The reactor is purged with nitrogen and the resin mixture warmed to 80° C. 4-Methylbenzyltri-p-tolylphosphonium bromide, 0.48 gm (0.988 millimole) dissolved in chloroform (23% n.v.) is added to the resin/bisphenol A slurry and the temperature is gradually increased to 150° C. over a 42 minute period. Heating is turned off at 150° C. and an exotherm is allowed to take place to 198° C. Air cooling is used to control the exotherm temperature to 198° C. The reaction temperature is maintained at 190° C. for 4 hours while samples are taken for product analyses. After reaction completion, the resin is poured out on aluminum foil. The characteristics of the advanced epoxy resin are given in Table VII.

EXAMPLE 14

A. Preparation of 4-methoxybenzyltri-p-tolylphosphonium acetateacetic acid complex catalyst Into a 100 milliliter glass reactor equipped with a thermometer connected to a temperature controller, a heating mantle, a condenser and a magnetic stirring bar, is charged 11.8 gms (0.0256 mole) of 4-methoxy benzyl tri-p-tolyl phosphonium chloride and 24.5 gms of acetic acid. To this mixture is added 1.1 gm of ammonia while maintaining a temperature below 60° C., This reaction mass is heated to 115° C. and maintained at that temperature for 4 hours, then cooled to 100° C. and maintained at that temperature for 15 hours. This reaction mixture is heated to 115° C. and maintained at that temperature for 5 hours, then cooled to 27° C. After filtering, the solid is washed with 40 gms of benzene, then centrifuged to separate the solid that is precipitated. This solution is vacuum distilled at 1mm Hg and 110° C. for 0.5 hour. There is obtained 5.1 gms of catalyst which has a melting point of 98°-106° C., 0.1% chloride and a chemical shift of 21.1 ppm (phosphoric acid reference).

B. Preparation of advanced epoxy resin using 4-methoxybenzyltri-p-tolylphosphonium acetateacetic acid complex as a catalyst Into a 1 liter 5 necked glass reactor equipped with a mechanical stirrer, a thermometer connected to a temperature controller and a heating mantle, is charged 329.25 gms (1.7607 equivalents) of a diglycidyl ether of bisphenol A having an EEW of 187 and 170.75 gms (1.4978 equivalents) of bisphenol A. The reactor is purged with nitrogen and the resin mixture warmed to 80° C. 4-Methoxybenzyltri-p-tolylphosphonium acetateacetic acid complex, 0.45 gm (0.826 millimole) dissolved in methanol (44% n.v.) is added to the resin/bisphenol A slurry and the temperature is gradually increased to 150° C. over a 40 minute period. Heating is turned off at 150° C. and an exotherm is allowed to take place to 191° C. Air cooling is used to control the exotherm temperature to 191° C. The reaction temperature is maintained at 190° C. for 4 hours while samples are taken for product analyses. After reaction completion, the resin is poured out on aluminum foil. The characteristics of the advanced epoxy resin are given in Table VII.

EXAMPLE 15

A. Preparation of 4-methoxybenzyltri-p-tolylphosphonium acetate.acetic acid complex catalyst The preparation is the same as in Example 15-A.

B. Preparation of advanced epoxy resin using 4-methoxybenzyltri-p-tolylphosphonium acetate.acetic acid eomplex as a catalyst Into a 1 liter 5 necked glass reactor equipped with a mechanical stirrer, a thermometer connected to a temperature controller and a heating mantle, is charged 329.25 gms (1.7607 equivalents) of a diglycidyl ether of bisphenol A having an EEW of 187 and 170.75 gms (1.4978 equivalents) of bisphenol A. The reactor is purged with nitrogen and the resin mixture warmed to 80° C. 4-Methoxybenzyltri-p-tolylphosphonium acetate.acetic acid complex, 0.57 gm (1.049 millimole) dissolved in methanol (55% n.v.) is added to the resin/bisphenol A slurry and the temperature is gradually increased to 150° C. over a 46 minute period. Heating is turned off at 150° C. and an exotherm is allowed to take place to 194° C. Air cooling is used to control the exotherm temperature to 194° C. The reaction temperature is maintained at 190° C. for 4 hours while samples are taken for product analyses. After reaction completion, the resin is poured out on aluminum foil. The characteristics of the advanced epoxy resin are given in Table VII.

EXAMPLE 16

A. Preparation of ethyltri-p-tolylphosphonium acetateacetic acid complex catalyst Into a 50 milliliter glass reactor equipped with a thermometer connected to a temperature controller, a heating mantle, a condenser and a magnetic stirring bar, are charged 9.15 gms (0.0222 mole) of ethyl-tri-p-tolylphosphonium bromide and 25.3 gms of acetic acid and the contents mixed until eompletely dissolved. Ammonia, 2 gms, is added over a period of 0.2 hr while maintaining a temperature of less than 90° C. The reaction mixture is stirred for 0 25 hr then an additional 6 gms of acetic acid is added and the contents continued to cool to 30° C. After 1 hour, the contents are heated to 110° C. and maintained at that temperature for 6.58 hrs. The contents are cooled to 100° C. and maintained at that temperature for 13.85 hrs, then heated to 110° C. and maintained at that temperature for 1.73 hours. The reaction mass is then cooled to 320° C., and then filtered. To this solution is added 40 gms of benzene and the mixture is allowed to remain overnight. The liquid layer is decanted and vacuum distilled to remove the volatiles at 1 mm Hg at 120° C. There is obtained 9.1 gms of dark, oily phosphonium salt that has a chemical shift of 21.3 ppm (phosphoric acid reference).

B. Preparation of advanced epoxy resin using ethyltrtolylphosphonium acetate.acetic acid complex as a catalyst Into a 1 liter 5 necked glass reactor equipped with a mechanical stirrer, a thermometer connected to a temperature controller and a heating mantle, is charged 329.25 gms (1.7607 equivalents) of a diglycidyl ether of bisphenol A having an EEW of 187 and 170.75 gms (1.4978 equivalents) of bisphenol A. The reactor is purged with nitrogen and the resin mixture warmed to 80° C. Ethyltri-p-tolylphosphonium acetate.acetic acid complex, 0.44 gm (0.973 millimole) dissolved in methanol (49.5% n.v.) is added to the resin/bisphenol A slurry and the temperature is gradually increased to 150° C. over a 47 minute period. Heating is turned off at 150° C. and an exotherm is allowed to take place to 205° C. Air cooling is used to control the exotherm temperature to 205° C. The reaction temperature is maintained at 190° C. for 4 hours while samples are taken for product analyses. After reaction completion, the resin is poured out on aluminum foil. The characteristics of the advanced epoxy resin are given in Table VII.

EXAMPLE 17

A. Preparation of 3,5-dinitrobenzyltri-p-tolyl phosphonium chloride catalyst

Into a 50 milliliter glass reactor equipped with a thermometer connected to a temperature controller, a heating mantle, a condenser and a magnetic stirring bar, is charged 5 gms (0.0164 mole) of tri-p-tolyl phosphine and 25 gms of toluene. The slurry is heated to 35° C. then 4.3 gm (0.0199 mole) of 3,5-dinitrobenzyl chloride is added. This reaction mass is heated to 60° C. and maintained at that temperature for 3 hours, then heated to 80° C. and maintained at that temperature for 2 hours, then cooled to 60° C. and maintained at that temperature for 16 hours, then cooed to 26° C. and filtered. The salt is washed with 3 gms of toluene and 3 gms of ethyl acetate and then vacuum dried. There is obtained 3.5 gms of catalyst which has a melting point of >250° C. and a chemical shift of 23.8 ppm (phosphoric acid reference).

B. Preparation of advanced epoxy resin using 3.5-dinitrobenzyltri-p-tolyl phosphonium chloride as a catalyst Into a 1 liter 5 necked glass reactor equipped with a mechanical stirrer, a thermometer connected to a temperature controller and a heating mantle, is charged 329.24 gms (1.7607 equivalents) of a diglycidyl ether of bisphenol A having an EEW of 187 and 170.71 gms (1.4975 equivalents) of bisphenol A. The reactor is purged with nitrogen and the resin mixture warmed to 80° C. 3,5-Dinitrobenzyltri-p-tolyl phosphonium chloride 0.5 gm (0.951 millimole) dissolved in methanol (17.5% n.v.) is added to the resin/bisphenol A slurry and the temperature is gradually increased to 150° C. over a 43 minute period. Heating is turned off at 150° C. and an exotherm is allowed to take place to 190° C. Air cooling is used to control the exotherm temperature to 190° C. The reaction temperature is maintained at 190° C. for 4 hours while samples are taken for product analyses. After reaction completion, the resin is poured out on aluminum foil. The characteristics of the advanced epoxy resin are given in Table VII.

EXAMPLE 18

A. Preparation of 3-hydroxypropyl tri-p-tolyl phosphonium bromide catalyst

Into a 50 milliliter glass reactor equipped with a thermometer connected to a temperature controller, a heating mantle, a condenser and a magnetic stirring bar, is charged 5.19 gms (0.0171 mole) of tri-p-tolyl phosphine and 23 gms of toluene. The slurry is heated to 40° C., then 2.85 gms (0.0205 mole) of 3-bromo-1-propanol is added. This reaction mass is heated to 40° C. in 1.2 hours, then increased the temperature to 80° C. and maintained at that temperature for 1 hour, then increased the temperature to 100° C. and maintained at that temperature for 1.75 hours, then cooled to 30° C., and then separated. The salt is washed with 10 gms of toluene, decanted and then vacuum dried. There is obtained 5.24 gms of an oily catalyst which has a chemical shift of 23.3 ppm (phosphoric acid reference).

B. Preparation of advanced epoxy resin using 3-hydroxypropyl tri-p-tolyl phosphonium bromide as a catalyst Into a 1 liter 5 necked glass reactor equipped with a mechanical stirrer, a thermometer connected to a temperature controller and a heating mantle, is charged 329.27 gms (1.7608 equivalents) of a diglycidyl ether of bisphenol A having an EEW of 187 and 170.75 gms (1.4978 equivalents) of bisphenol A. The reactor is purged with nitrogen and the resin mixture warmed to 80° C. 3-Hydroxypropyl tri-p-tolyl phosphonium bromide, 0.43 gm (0.970 millimole) dissolved in methanol (33.3% n.v.) is added to the resin/bisphenol A slurry and the temperature is gradually increased to 150° C. over a 45 minute period. Heating is turned off at 150° C. and an exotherm is allowed to take place to 194° C. Air cooling is used to control the exotherm temperature to 194° C. The reaction temperature is maintained at 190° C. for 4 hours while samples are taken for product analyses. After reaction completion, the resin is poured out on aluminum foil. The characteristics of the advanced epoxy resin are given in Table VII.

EXAMPLE 19

A. Preparation of 4-bromobenzyltri-p-tolyl phosphonium bromide catalyst

Into a 50 milliliter glass reactor equipped with a thermometer connected to a temperature controller, a heating mantle, a condenser and a magnetic stirring bar, is charged 5.04 gms (0.0166 mole) of tri-p-tolyl phosphine and 25 gms of toluene. The slurry is heated to 30° C. then 4.6 gms (0.0184 mole) of 4-bromobenzyl bromide is added. This reaction mass is heated to 100° C. and maintained at that temperature for 3.5 hours, then cooled to 29° C. and the resulting phosphonium salt collected by filtration. The salt is washed with 12 gms of toluene then vacuum dried. There is obtained 7.5 gms of catalyst which has a melting point of >250° C. and a chemical shift of 22.1 ppm (phosphoric acid reference).

B. Preparation of advanced epoxy resin using 4-bromobenzyltri-p-tolyl phosphonium bromide as a catalyst Into a 1 liter 5 necked glass reactor equipped with a mechanical stirrer, a thermometer connected to a temperature controller and a heating mantle, is charged 329.25 gms (1.7607 equivalents) of a diglycidyl ether of bisphenol A having an EEW of 187 and 170.75 gms (1.4978 equivalents) of bisphenol A. The reactor is purged with nitrogen and the resin mixture warmed to 80° C. 4-Bromobenzyltri-p-tolyl phosphonium bromide, 0.42 gm (0.975 millimole) dissolved in methanol (25.4% n.v.) is added to the resin/bisphenol A slurry and the temperature is gradually increased to 150° C. over a 50 minute period. Heating is turned off at 150° C. and an exotherm is allowed to take place to 190° C. Air cooling is used to control the exotherm temperature to 190° C. The reaction temperature is maintained at 190° C. for 4 hours while samples are taken for product analyses. After reaction completion, the resin is poured out on aluminum foil. The characteristics of the advanced epoxy resin are given in Table VII.

EXAMPLE 20

A. Preparation of butyl-1,4-bis(tri-p-tolylphosphonium) dibromide catalyst

Into a 50 milliliter glass reactor equipped with a thermometer connected to a temperature controller, a heating mantle, a condenser and a magnetic stirring bar, is charged 9.4 gms (0.0309 mole) of tri-p-tolyl phosphine and 28 gms of toluene. The slurry is heated to 40° C. then 3.4 gms (0.0157 mole) of 1,4-dibromobutane is added. This reaction mass is heated to 90° C. and maintained at that temperature for 7.5 hours, then cooled to 20° C. and the resulting phosphonium salt collected by filtration. The salt is washed with 20 gms of toluene and 20 gms of ethyl acetate, then vacuum dried. There is obtained 8.75 gms of catalyst which has a melting point of 220°-237° C. and a chemical shift of 23.3 ppm (phosphoric acid reference).

B. Preparation of advanced epoxy resin using butyl-1,4-bis(tri-p-tolvlphosphonium) dibromide as a catalyst Into a 1 liter 5 necked glass reactor equipped with a mechanical stirrer, a thermometer connected to a temperature controller and a heating mantle, is charged 329.25 gms (1.7607 equivalents) of a diglycidyl ether of bisphenol A having an EEW of 187 and 170.75 gms (1.4978 equivalents) of bisphenol A. The reactor is purged with nitrogen and the resin mixture warmed to 80° C. Butyl-1,4-bis(tri-p-tolylphosphonium) dibromide, 0.8 gm (0.976 millimole) dissolved in methanol (36.9% n.v.) is added to the resin/bisphenol A slurry and the temperature is gradually increased to 150° C. over a 43 minute period. Heating is turned off at 150° C. and an exotherm is allowed to take place to 193° C. Air cooling is used to control the exotherm temperature to 193° C. The reaction temperature is maintained at 190° C. for 4 hours while samples are taken for product analyses. After reaction completion, the resin is poured out on aluminum foil. The characteristics of the advanced epoxy resin are given in Table VII.

EXAMPLE 21

A. Preparation of ethyl-2-phenyl-1-tri-p-tolylphosphonium bromide catalyst

Into a 50 milliliter glass reactor (flask) equipped with a thermometer connected to a temperature controller, a heating mantle, a condenser and a magnetic stirring bar, is charged 5 gms (0.0164 mole) of tri-p-tolyl phosphine and 24 gms of xylene. The slurry is heated to 60° C. then 3.5 gms (0.0189 mole) of 2-bromo-ethyl benzene is added. This reaction mass is heated to 130° C. and maintained at that temperature for 2.5 hours and the product is removed from the reactor (flask). There is obtained 8.67 gms of an oily catalyst.

B. Preparation of advanced epoxy resin using ethyl-2-phenyl-1-tri-p-tolylphosphonium bromide as a catalyst Into a 1 liter 5 necked glass reactor equipped with a mechanical stirrer, a thermometer connected to a temperature controller and a heating mantle, is charged 329.25 gms (1.7607 equivalents) of a diglycidyl ether of bisphenol A having an EEW of 187 and 170.75 gms (1.4978 equivalents) of bisphenol A. The reactor is purged with nitrogen and the resin mixture warmed to 82° C. Ethyl-2-phenyl-1-tri-p-tolylphosphonium bromide, 0.5 gm (1.022 millimole) dissolved in methanol (53% n.v.) is added to the resin/bisphenol A slurry and the temperature is gradually increased to 150° C. over a 35 minute period. Heating is turned off at 150° C. and an exotherm is allowed to take place to 191° C. Air cooling is used to control the exotherm temperature to 191° C. The reaction temperature is maintained at 190° C. for 4 hours while samples are taken for product analyses. After reaction completion, the resin is poured out on aluminum foil. The characteristics of the advanced epoxy resin are given in Table VII.

EXAMPLE 22

A. Preparation of propyl-3-phenyl-1-tri-p-tolylphosphonium bromide catalyst

Into a 50 milliliter glass reactor equipped with a thermometer connected to a temperature controller, a heating mantle, a condenser and a magnetic stirring bar, is charged 5 gms (0.0164 mole) of tri-p-tolyl phosphine and 24 gms of toluene. The slurry is heated to 45° C. then 3.6 gms (0.0181 mole) of 1-bromo-3-phenyl propane is added. This reaction mass is heated to 130° C. and maintained at that temperature for 3.5 hours, then cooled and the resulting phosphonium salt collected by filtration. The salt is then vacuum dried. There is obtained 5.3 gms of catalyst which has a melting point of 241°-245° C.

B. Preparation of advanced epoxy resin using propyl-3-phenyl-1-tri-p-tolylphosphonium bromide as a catalyst Into a 1 liter 5 necked glass reactor equipped with a mechanical stirrer, a thermometer connected to a temperature controller and a heating mantle, is charged 329.25 gms (1.7607 equivalents) of a diglycidyl ether of bisphenol A having an EEW of 187 and 170.75 gms (1.4978 equivalents) of bisphenol A. The reactor is purged with nitrogen and the resin mixture warmed to 80° C. Propyl-3-phenyl-1-tri-p-tolylphosphonium bromide, 0.49 gm (0.974 millimole) dissolved in methanol (46% n.v.) is added to the resin/bisphenol A slurry and the temperature is gradually increased to 150° C. over a 45 minute period. Heating is turned off at 150° C. and an exotherm is allowed to take place to 189.5° C. Air cooling is used to control the exotherm temperature to 189.5° C. The reaction temperature is maintained at 190° C. for 4 hours while samples are taken for product analyses. After reaction completion, the resin is poured out on aluminum foil. The characteristics of the advanced epoxy resin are given in Table VII.

EXAMPLE 23

A. Preparation of butyl-tri-p-tolyl- phosphonium bromide catalyst

Into a 50 milliliter glass reactor equipped with a thermometer connected to a temperature controller, a heating mantle, a condenser and a magnetic stirring bar, is charged 5 gms (0.0164 mole) of tri-p-tolyl phosphine and 24 gms of xylene. The slurry is heated to 45° C. then 2.7 gms (0.0197 mole) of 1-bromo butane is added. This reaction mass is heated to 50° C. and maintained at that temperature for 0.65 hour, then heated to 80C and maintained at that temperature for 16.08 hours, then heated to 100C and maintained at that temperature for —.97 hour. The salt is decanted and then vacuum dried. There is obtained 2.098 gms of an oily catalyst.

B. Preparation of advanced epoxy resin using butyl-tri-p-tolyl- phosphonium bromide as a catalyst Into a 1 liter 5 necked glass reactor equipped with a mechanical stirrer, a thermometer connected to a temperature controller and a heating mantle, is charged 329.26 gms (1.7607 equivalents) of a diglycidyl ether of bisphenol A having an EEW of 187 and 170.75 gms (1.4978 equivalents) of bisphenol A. The reactor is purged with nitrogen and the resin mixture warmed to 81° C. Butyl-tri-p-tolylphosphonium bromide, 0.43 gm (0.976 millimole) dissolved in methanol (39.5% n.v.) is added to the resin/bisphenol A slurry and the temperature is gradually increased to 150° C. over a 41 minute period. Heating is turned off at 150° C. and an exotherm is allowed to take place to 199° C. Air cooling is used to control the exotherm temperature to 199° C. The reaction temperature is maintained at 190° C. for 4 hours while samples are taken for product analyses. After reaction completion, the resin is poured out on aluminum foil. The characteristics of the advanced epoxy resin are given in Table VII.

EXAMPLE 24

( A. Preparation of 4-methoxybenzyl-tri-p-tolyl-phosphonium phosphate catalyst

Into a 2 oz. (59 mL) bottle is placed 1.38 gm of 4-methoxybenzyl-tri-p-tolylphosphonium acetate.acetic acid complex followed by the addition of 1.75 gms of methanol. To another 2 oz. (59 mL) bottle is added 2.2 gms of water and 3.4 gms of 85% phosphoric acid and the contents mixed completely. To the first 2 oz. bottle is placed 0.56 gm of the phosphoric acid solution and the contents mixed completely.

B. Preparation of advanced epoxy resin using 4-methoxybenzyl-tri-p-tolyl-phosphonium phosphate as a catalyst Into a 1 liter 5 necked glass reactor equipped with a mechanical stirrer, a thermometer connected to a temperature controller and a heating mantle, is charged 329.26 gms (1.7607 equivalents) of a diglycidyl ether of bisphenol A having an EEW of 187 and 170.75 gms (1.4978 equivalents) of bisphenol A. The reactor is purged with nitrogen and the resin mixture warmed to 81° C. 4-Methoxybenzyl-tri-p-tolylphosphonium phosphate, 0.51 gm (0.977 millimole) dissolved in methanol (37.4% n.v.) is added to the resin/bisphenol A slurry and the temperature is gradually increased to 150° C. over a 47 minute period. Heating is turned off at 150° C. and an exotherm is allowed to take place to 211° C. Air cooling is used to control the exotherm temperature to 211° C. The reaction temperature is maintained at 190° C. for 4 hours while samples are taken for product analyses. After reaction completion, the resin is poured out on aluminum foil. The characteristics of the advanced epoxy resin are given in Table VII.

EXAMPLE 25

A. Preparalion of ethyl-tri-p-tolyl-phosphonium acetate.acetic acid complex catalyst The preparation of this catalyst is the same as in Example 16-A.

B. Preparation of advanced epoxy resin using ethyltri-p-tolyl-phosphonium acetate.acetic acid complex as a catalyst Into a 1 liter 5 necked glass reactor equipped with a mechanical stirrer, a thermometer connected to a temperature controller and a heating mantle, is charged 325 gms (1.738 equivalents) of a diglycidyl ether of bisphenol A having an EEW of 187 and 175 gms (1.5351 equivalents) of bisphenol A. The reactor is purged with nitrogen and the resin mixture warmed to 85° C. Ethyl-tri-p-tolylphosphonium acetate.acetic acid complex, 0.44 gm (0.973 millimole) dissolved in methanol (50% n.v.) is added to the resin/bisphenol A slurry and the temperature is gradually increased to 150° C. over a 40 minute period. Heating is turned off at 150° C. and an exotherm is allowed to take place to 210° C. Air cooling is used to control the exotherm temperature to 210° C. The reaction temperature is maintained at 200° C. for 4 hours while samples are taken for product analyses. After reaction completion, the resin is poured out on aluminum foil. The characteristics of the advanced epoxy resin are given in Table VII.

EXAMPLE 26

A. Preparation of ethyl-tri-o-tolyl-phosphonium iodide catalyst

Into a 50 milliliter glass reactor equipped with a thermometer connected to a temperature controller, a heating mantle, a condenser and a magnetic stirring bar, is charged 5 gms (0.0164 mole) of tri-o-tolyl phosphine and 23 gms of toluene. The slurry is heated to 27° C., then 3.08 gms (0.0177 mole) of ethyl iodide is added. This reaction mass is heated to 70° C. and maintained at that temperature for 17 hours, then heated to 100° C. and maintained at that temperature for 9 hours, then cooled to 70° C. and maintained at that temperature for 15 hours, then cooled to 26° C. and the resulting phosphonium salt collected by filtration. The salt is washed with 6 gms of toluene then vacuum dried. There if obtained 1.6 gms of catalyst which has a melting point of 247°-250° C. and a chemical shift of 28 5 ppm (phosphoric acid reference).

B. Preparation of advanced epoxy resin using ethyltri-o-tolyl-phosphonium iodide as a catalyst Into a 1 liter 5 necked glass reactor equipped with a mechanical stirrer, a thermometer connected to a temperature controller and a heating mantle, is charged 425 gms (2.394 equivalents) of a diglycidyl ether of bisphenol F having an EEW of 177.5 and 75 gms (1.0274 equivalents) of adipic acid. The reactor is purged with nitrogen and the resin mixture warmed to 80° C. Ethyl-tri(o-tolyl)phosphonium iodide, 0.38 gm (0.834 millimole) dissolved in a 16% n.v. mixture methanol / chloroform (87.7% / 12.3%) is added to the resin/adipic acid slurry and the temperature is gradually increased to 150° C. over a 29 minute period. Heating is turned off at 150° C. and an exotherm is allowed to take place to 188° C. Air cooling is used to control the exotherm temperature to 188° C. The reaction temperature is maintained at 180° C. for 2 hours while samples are taken for product analyses. After reaction completion, the resin is poured out on aluminum foil. The characteristics of the advanced epoxy resin are given in Table VII.

TABLE VII

| | Viscosity at 200° C.$^a$ | | |
|---|---|---|---|
| | cps | Pa · s | EEW$^c$ |
| C.E. E* | 1,140 | 1.140 | 1,435 |
| C.E. F* | 3,400 | 3.400 | 1,694 |
| Ex. 5 | 3,040 | 3.040 | 1,770 |
| Ex. 6 | 2,240 | 2.240 | 1,680 |
| Ex. 7 | 2,100 | 2.100 | 1,660 |
| Ex. 8 | 14,560 | 14.560 | 2,429 |
| Ex. 9 | 8,640 | 8.640 | 2,363 |
| Ex. 10 | 8,640 | 8.640 | 2,312 |
| Ex. 11 | 2,760 | 2.760 | 2,129 |
| Ex. 12 | 16,320 | 16.320 | 2,376 |
| Ex. 13 | 4,600 | 4.600 | 1,937 |
| Ex. 14 | 5,920 | 5.920 | 2,019 |
| Ex. 15 | 6,560 | 6.560 | 2,048 |
| Ex. 16 | 17,600 | 17.600 | 2,337 |
| Ex. 17 | 320 | 0.320 | 1,508 |
| Ex. 18 | 13,120 | 13.120 | 2,299 |
| Ex. 19 | 1,200 | 1.200 | 1,478 |
| Ex. 20 | 15,120 | 15.120 | 1,768 |
| Ex. 21 | 8,000 | 8.000 | 1,991 |
| Ex. 22 | 15,680 | 15.680 | 2,124 |
| Ex. 23 | 15,680 | 15.680 | 2,044 |
| Ex. 24 | 5,600 | 5.600 | 1,666 |
| Ex. 25 | 37,760 | 37.600 | 3,139 |
| Ex. 26 | 270$^b$ | 0.270 | 432 |

Footnotes to Table VII.
*Not an example of the present invention.
$^a$The viscosity is determined by the cone and plate method.
$^b$Viscosity is at 150° C. rather than at 200° C.
$^c$Epoxide equivalent weight.

EXAMPLE 27

A. Preparation and Testing of a precatalyzed compositions containing an epoxy resin and a catalyst 350 gms of a diglycidyl ether of bisphenol A having an epoxide equivalent weight of 187.2 is diluted with 14 gms of xylene to lower the viscosity. After the epoxy resin/xylene mixture is thoroughly agitated, the phosphine or phosphonium catalyst is added in an amount to provide 1,000 ppm of catalyst by weight based on the weight of the epoxy resin. The precatalyzed epoxy resin mixture is then agitated using a mechanical mixer and subjected to heat aging in a convection oven controlled at a temperature of 50° C. After heat aging for two weeks, the precatalyzed resin compositions are removed from the oven and analyzed. The catalysts employed and the results of the heat aging are given in Table VIII.

TABLE VIII

| | | EEW$^g$ | |
|---|---|---|---|
| Sample | Catalyst | Initial | After Storage |
| A | EtTTPBr$^a$ | 194.7 | 196.2 |
| B* | EtTPPBr$^b$ | 195.1 | 198.9 |
| C | EtTTPAc.HAc$^c$ | 194.7 | 196.7 |
| D* | EtTPPAc.HAc$^d$ | 195.7 | 200.8 |
| E | TTP$^e$ | 194.7 | 195.5 |
| F* | TPP$^f$ | 196.7 | 196.7 |

*Not an example of the present invention.
$^a$Ethyl-tri-o-tolylphosphonium bromide.
$^b$Ethyltriphenylphosphonium bromide.
$^c$Ethyl-tri-p-tolylphosphonium acetate.acetic acid complex.
$^d$Ethyltriphenylphosphonium acetate.acetic acid complex.
$^e$Tri-o-tolyl phosphine.
$^f$Triphenyl phosphine.
$^g$Epoxide equivalent weight.

B. Use of heat aged precatalyzed compositions as a catalyst for preparing an advanced epoxy resin 167 grams of the heat aged precatalyzed resins from Example 27-A is charged into a 5-neck 500 ml glass reactor and 82.9 gms of bisphenol A is added. The target EEW is 2,000. The advancement procedure is identical to that described in Example 1. Two hours after the exotherm, a sample is taken and analyzed. The results are given in Table IX.

TABLE IX

| Sample | Catalyst | EEW$^g$ | Mw$^h$ |
|---|---|---|---|
| A | EtTTPBr$^a$ | 2,027 | 12,721 |
| B* | EtPPBr$^b$ | 1,869 | 10,472 |
| C | EtTTPAc.HAc$^c$ | 2,086 | 12,865 |
| D* | EtTPPAc.HAc$^d$ | 1,789 | 8,650 |
| E | TTP$^e$ | 2,047 | 12,850 |
| F* | TPP$^f$ | 1,049 | 4,529 |

*Not an example of the present invention.
$^a$Ethyl-tri-o-tolylphosphonium bromide.
$^b$Ethyltriphenylphosphonium bromide.
$^c$Ethyl-tri-p-tolylphosphonium acetate.acetic acid complex.
$^d$Ethyltriphenylphosphonium acetate.acetic acid complex.
$^e$Tri-o-tolyl phosphine.
$^f$Triphenyl phosphine.
$^g$Epoxide equivalent weight.
$^h$Weight average molecular weight.

The data in Tables VIII and IX indicate that the tritoly phosphine and the tritolyl-containing phosphonium catalysts are more stable in the precatalyzed epoxy resin compositions. They did not have any problem reaching the target EEW of 2,000 after aging for 2 weeks at 50° C. whereas the conventional catalysts lost reactivity and did not reach the target EEW.

EXAMPLE 28

This example employs a Werner-Pfleiderer ZSK-30 fully intermeshing, co-rotating twin screw extruder. The extruder barrel is 1,410 millimeters in length excluding the die. The extruder barrel has an internal diameter of 30 millimeters making the length to diameter ratio 44/1. The barrel consists of 15 barrel sections and two guide plates. In the 15 sections, there is a feed section: 6 sections that could be used as vacuum or vent ports, injection ports or plugged to become solid sections, and eight solid sections. The barrel configuration used in this example is a feed port section, vent port section, one solid section, guide plate, seven solid sections, two plugged vent port sections, guide plate, and die section. There are four intensive mixing sections designed into the screws which are 1422 millimeters long excluding the screw tips. It should be noted that the screws extend into the die section of the barrel. The barrel is divided into 9 heating and cooling zones excluding the feed port section which is individually cooled. The 9th zone includes the die section of the barrel. The zones are electronically heated and water cooled. A temperature controller is used to control the barrel temperature of each zone. The melt temperature is measured in the sixth barrel section and at the die.

The liquid epoxy resin is fed from a vessel heated to 65° C. The melt temperature is controlled at 65° C. to facilitate pumping. The bisphenol A is fed from a melt reservoir which is controlled at 170° C. The two raw materials are fed to the feed port section of the extruder (see extruder description). Catalyst, as a 70 percent by weight solution in methanol is fed separately to the feed port section or admixed with the liquid resin just prior to the extruder feed port. The various heat zones are controlled to keep the melt below 200° C. and the feed rate and screw speed are controlled to give an average residence time in the extruder of 2.5 to 3.5 minutes. The material is collected in thin sheets, cooled in air, and crushed into a powder. Reactants and analysis of the resultant advanced epoxy resins are shown in Table X.

As shown in Table X, the ethyl tri(p-tolyl) phosphonium catalyst is a much more efficient catalyst for the extruder process. The degree of reaction is indicated by the residual phenolic OH concentration. The ethyl tri(p-tolyl) phosphonium acetate.acetic acid complex catalyst (Runs A and C) can carry out the reaction to a higher conversion (lower phenolic OH) at a lower catalyst charge than the ethyltriphenylphosphonium acetate.acetic acid complex catalyst (Runs B and D).

EXAMPLE 29

Reaction of an epoxide with an anhydride.

Into an aluminum pan are combined 5 g (0.03 equiv.) of diglycidyl glutarate, 2.77 g (0.034 equiv.) of a mixture of methylhexahydrophthalic anhydride and hexahydrophthalic anhydride (70/30 by weight, respectively), and $5.39 \times 10^{-4}$ equivalent (based on phosphorus) of catalyst in methanol (70% solids). The mixture is heated for 30 minutes at 82° C. on a Tetrahedron hot plate. After cooling to approximately room temperature, the viscosity of the mixture is determined at 25° C. The results are given in the following Table XI.

TABLE X

|  | Run A | Run B* | Run C | Run D* |
|---|---|---|---|---|
| Epoxy Resin | DGEBA[a] | DGEBA[a] | DGEBA[a] | DGEBA[a] |
| lbs/hr; | 12.8924 | 12.8924 | 12.8924 | 12.8924 |
| lb equiv/hr | 00.07128 | 00.07128 | 00.07128 | 00.07128 |
| (kg/hr; | 5.8479 | 5.8479 | 5.8479 | 5.8479 |
| g equiv/hr) | 32.579 | 32.579 | 32.579 | 32.579 |
| Bisphenol A |  |  |  |  |
| lbs/hr; | 7.0176 | 7.0176 | 7.0176 | 7.0176 |
| lb equiv/hr | 0.0625 | 0.0625 | 0.0625 | 0.0625 |
| (kg/hr; | 3.2239 | 3.2239 | 3.2239 | 3.2239 |
| g equiv/hr) | 28.2801 | 28.2801 | 28.2801 | 28.2801 |
| Equiv. ratio of phenolic OH to epoxide. | 1.1520:1 | 1.1520:1 | 1.1520:1 | 1.1520:1 |
| Catalyst | TTEPA.HAC[b] | ETPA.HAC[c] | TTEPA.HAC[b] | ETPA.HAC[c] |
| g/hr | 4.327 | 4.2814 | 12.0723 | 10.886 |
| g equiv/hr | 0.00951 | 0.01029 | 0.02655 | 0.02655 |
| EEW of product | 1.916 | 802 | 2.185 | 1.891 |
| Residual Phenolic OH in product, ppm | 1,293 | 5,090 | 710 | 1,717 |
| MMw[d] of product | 12,420 | 3,281 | 14,670 | 11,588 |

*Not an example of the present invention.
[a]Diglycidyl ether of bisphenol A having an EEW of 185.
[b]tri-p-tolylethylphosphonium acetate.acetic acid complex.
[c]Ethyltriphenylphosphonium acetate.acetic acid complex.
[d]Weight average molecular weight.

TABLE XI

|  |  | Viscosity | |
|---|---|---|---|
|  | Catalyst | cps | Pa · s |
| Sample A | Et(-p-T)$_3$PBr[a] | 7,862 | 7.862 |
| Sample B* | Et(Ph)$_3$PBr[b] | 3,478 | 3.478 |

*Not an example of the present invention.
[a]Ethyltri-p-tolylphosphonium bromide.
[b]Ethyltriphenylphosphonium bromide.

What is claimed is:

1. In a precatalyzed composition comprising (A) at least one compound containing an average of at least one vicinal epoxide group per molecule and (B) at least one phosphonium or phosphine catalyst; the improvement which comprises employing as the phosphonium or phosphine catalyst, one having at least three $C_1$ to $C_4$ alkyl phenyl groups attached to the phosphorus atom per molecule.

2. The precatalyzed composition of claim 1 wherein the catalyst is a phosphonium compound represented by the following general formulas II or III

Formula II wherein each R is independently a $C_1$ to $C_4$ alkyl phenyl group; each R' is independently hydrogen, a monovalent hydrocarbyl group, bromine or chlorine, nitro or $-C \equiv N$ or OH or alkyl or alkoxy or halogen substituted hydrocarbyl group having from 1 to

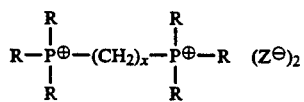

about 20 carbon atoms, or an R group; Z is any suitable anion; and x has value from 1 to about 20.

3. The precatalyzed composition of claim 2 wherein the catalyst is ethyltri-o-tolyl-phosphonium iodide, ethyltri-p-tolylphophonium bromide, ethyltri-o-tolylphosphonium acetate.acetic acid complex, ethyltri-p-tolylphosphonium acetate-acetic acid complex, 4-methylbenzyltri-p-tolylphosphonium acetate/acetic acid complex, 4-methylbenzyltri-p-tolyphosphonium chloride, 4-methoxybenzyltri-p-tolylphosphonium chloride, or any combination thereof; and the vicinal epoxide-containing compound is a glcidyl either of a dihydric phenol or a diglycidyl ester of a dicarboxylic acid, or any combination thereof.

4. The precatalyzed composition of claim 1 wherein the catalyst is a phosphine represented by the following general formula I

wherein each R is independently a $C_1$ to $C_4$ alkyl phenyl group.

5. The precatalyzed composition of claim 4 wherein the catalyst is tri-o-tolylphosphine, tri-p-tolylphosphine, tri-m-tolylphosphine, or any combination thereof.

* * * * *

UNITED STATES PATENT AND TRADEMARK OFFICE
CERTIFICATE OF CORRECTION

PATENT NO. : 5,202,407
DATED : April 13, 1993
INVENTOR(S) : Ha Quoc Pham, Pamela A. Hardcastle It is certified that error appears in the above-indentified patent and that said Letters Patent is hereby corrected as shown below:

Column 33, lines 13-17 reads as:

"4-methylbenzyltri-p-tolylphosphonium acetate/acetic acid complex, 4-methylbenzyltri-p-tolylphosphonium chloride, 4-methoxybenzyltri-p-tolylphosphonium chloride,"

should read as:

--methoxybenzyltri-p-tolylphosphonium acetate.acetic acid complex, 4-methylbenzyltri-p-tolylphosphonium acetate.acetic acid complex, 4-methlybenzyltri-p-tolyphosphonium chloride, 4-methoxybenzyltri-p-tolylphosphonium chloride,--

Signed and Sealed this

Twenty-ninth Day of March, 1994

Attest:

BRUCE LEHMAN

*Attesting Officer*   *Commissioner of Patents and Trademarks*